US011469625B2

(12) United States Patent
Byun et al.

(10) Patent No.: US 11,469,625 B2
(45) Date of Patent: Oct. 11, 2022

(54) ELECTRONIC DEVICE FOR WIRELESSLY TRANSMITTING POWER AND METHOD OF OPERATING THE SAME

(71) Applicant: SAMSUNG ELECTRONICS CO., LTD., Suwon-si (KR)

(72) Inventors: Kangho Byun, Suwon-si (KR); Seogyong Jeong, Suwon-si (KR); Jaehyun Park, Suwon-si (KR); Jihyun Yang, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 16/951,581

(22) Filed: Nov. 18, 2020

(65) Prior Publication Data

US 2021/0152030 A1 May 20, 2021

Related U.S. Application Data

(60) Provisional application No. 62/936,829, filed on Nov. 18, 2019.

(30) Foreign Application Priority Data

Mar. 6, 2020 (KR) .................. 10-2020-0028280

(51) Int. Cl.
H02J 50/60 (2016.01)
H01F 38/14 (2006.01)
H02J 50/12 (2016.01)

(52) U.S. Cl.
CPC .............. H02J 50/60 (2016.02); H01F 38/14 (2013.01); H02J 50/12 (2016.02)

(58) Field of Classification Search
CPC .... H02J 50/60; H02J 50/12; H02J 7/02; H02J 50/402; H01F 38/14; H01F 27/38
See application file for complete search history.

(56) References Cited

U.S. PATENT DOCUMENTS

| 9,423,439 | B2 * | 8/2016 | Jung ................... G01R 29/0814 |
| 2012/0242163 | A1 * | 9/2012 | Jung ................... H02J 7/00308 307/104 |
| 2016/0218520 | A1 * | 7/2016 | Mehas ..................... H02J 50/90 |
| 2016/0218559 | A1 | 7/2016 | Mehas et al. |
| 2017/0085136 | A1 * | 3/2017 | Pfeiffer ................ H04B 5/0037 |
| 2018/0108474 | A1 * | 4/2018 | Omae ..................... H02J 50/80 |

(Continued)

FOREIGN PATENT DOCUMENTS

| KR | 10-2012-0077448 A | 7/2012 |
| KR | 10-1213649 B1 | 12/2012 |

(Continued)

Primary Examiner — Daniel Kessie
Assistant Examiner — Brian K Baxter
(74) Attorney, Agent, or Firm — Sughrue Mion, PLLC

(57) ABSTRACT

An electronic device for wirelessly transmitting power includes a first coil assembly; a second coil assembly; and a processor configured to control to generate a first magnetic field by applying first current to the first coil assembly; obtain a plurality of first sensing values of the first magnetic field sensed by a plurality of coils included in the second coil assembly; and identify whether a foreign material exists in a power transmission area of the electronic device based on the plurality of first sensing values.

18 Claims, 17 Drawing Sheets

(56) References Cited

U.S. PATENT DOCUMENTS

| | | | |
|---|---|---|---|
| 2018/0219428 A1* | 8/2018 | Bae | H02J 7/00034 |
| 2018/0323659 A1* | 11/2018 | Maniktala | H02J 50/60 |
| 2019/0068001 A1* | 2/2019 | Lovas | H02J 50/80 |
| 2019/0103771 A1* | 4/2019 | Piasecki | H04B 5/0037 |
| 2019/0109498 A1* | 4/2019 | Stingu | H03F 3/217 |
| 2019/0280533 A1 | 9/2019 | Lee et al. | |
| 2019/0308516 A1 | 10/2019 | Braeuchle et al. | |
| 2020/0343765 A1* | 10/2020 | Kwon | G01V 3/00 |
| 2021/0083525 A1* | 3/2021 | Stingu | G06F 1/1656 |
| 2021/0265875 A1* | 8/2021 | Park | H02J 50/60 |

FOREIGN PATENT DOCUMENTS

| | | |
|---|---|---|
| KR | 10-1812444 B1 | 12/2017 |
| KR | 10-2019-0015953 A | 2/2019 |
| KR | 10-2019-0077526 A | 7/2019 |
| KR | 10-2019-0106079 A | 9/2019 |
| KR | 10-2019-0111375 A | 10/2019 |

* cited by examiner

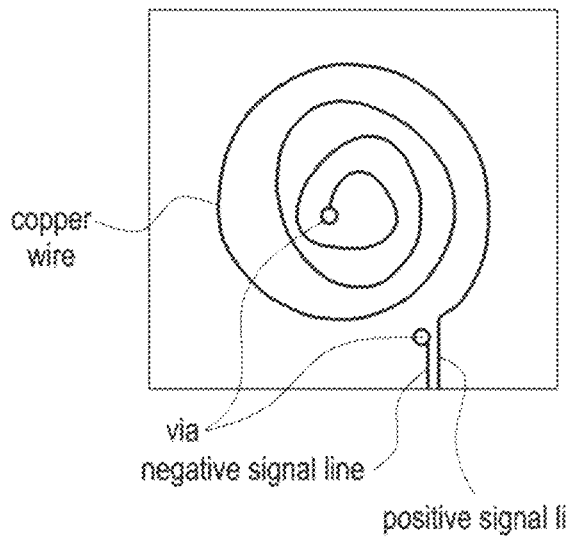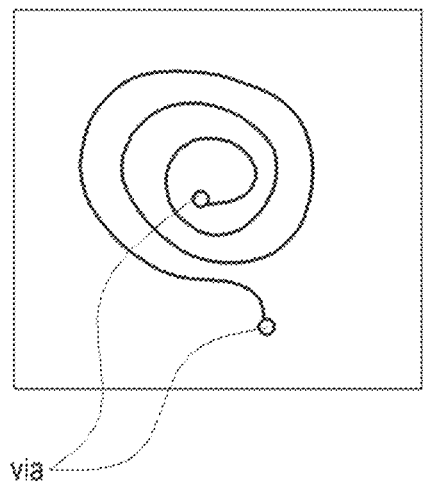
FIG.4D  FIG.4E
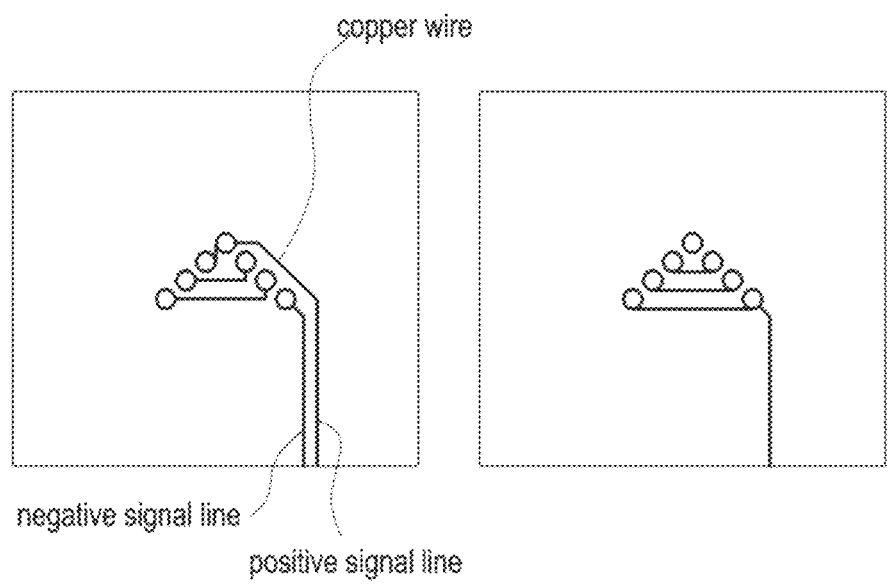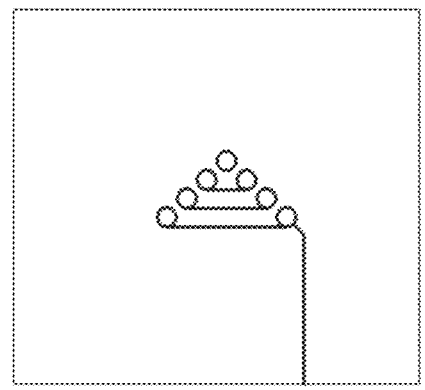
FIG.4F  FIG.4G

ELECTRONIC DEVICE FOR WIRELESSLY TRANSMITTING POWER AND METHOD OF OPERATING THE SAME

CROSS-REFERENCE TO RELATED APPLICATION(S)

This application is based on and claims the benefit of U.S. Provisional Patent Application No. 62/936,829, filed on Nov. 18, 2019, in the United States Patent and Trademark Office, and claims priority under 35 U.S.C. § 119 to Korean Patent Application No. 10-2020-0028280, filed on Mar. 6, 2020, in the Korean Intellectual Property Office, the disclosures of which are incorporated herein by reference in their entireties.

BACKGROUND

Field

The disclosure relates to an electronic device for wirelessly transmitting power, which is configured to sense a foreign material in a power transmission area, and a method of operating the same.

Description of Related Art

In view of their nature, mobile terminals such as mobile phones or personal digital assistants (PDAs) are powered by rechargeable batteries. To charge the batteries, the mobile terminals supply electric energy to the batteries through a separate charger. In general, a charger and a battery each have an exterior contact terminal and thus are electrically connected to each other by contacting their contact terminals.

This contact charging scheme faces the problem of vulnerability of contact terminals to contamination of foreign materials and the resulting unreliable battery charging because the contact terminals protrude outward. Moreover, when the contact terminals are exposed to moisture, the batteries are not charged properly.

To address the above problem, wireless charging or contactless charging technologies have recently been developed and applied to many electronic devices.

Such a wireless charging technology is based on wireless power transmission and reception. For example, once a mobile phone is placed on a charging pad without being connected to an additional charging connector, its battery is automatically charged. Among wirelessly charged products, wireless electric toothbrushes or wireless electric shavers are well known. The wireless charging technology offers the benefits of increased waterproofness due to wireless charging of electronic products and enhanced portability due to no need for a wired charger for electronic devices. Further, it is expected that various relevant wireless charging technologies will be more developed in the upcoming era of electric vehicles.

The three primary wireless charging schemes include electromagnetic induction using coils, resonance-based charging, and radio frequency (RF)/microwave radiation based on conversion of electric energy to microwaves.

So far, the electromagnetic induction-based wireless charging scheme has been dominantly popular. It is foreseeable that every electronic product will be charged cordlessly at any time in any place in the near future.

Electromagnetic induction-based power transmission means power transfer between primary and secondary coils. When a magnet moves through a coil, current is induced. Based on this principle, a transmitter generates a magnetic field and a receiver produces energy by current induced by a change in the magnetic field. This phenomenon is called magnetic induction, and power transmission based on magnetic induction is highly efficient in energy transfer.

Resonated electromagnetic waves can carry electric energy, instead of sound. The resonant electric energy is directly transferred only in the presence of a device having the same resonant frequency, while the unused electric energy is reabsorbed into the electromagnetic field rather than it is dispersed in the air. Thus, the resonant electric energy does not affect nearby machines or human bodies, compared to other electromagnetic waves.

When a wireless power transmitter wirelessly transmits power to a wireless power receiver, the wireless power transmitter should be free of a foreign material in a power transmission area. The presence of a foreign material in the power transmission area may result in the decrease of power transmission efficiency and heat generation due to power consumption of the foreign material. Accordingly, a wireless power system should detect whether a foreign material exists in a power transmission area.

A wireless power system may identify whether a foreign material exists in a power transmission area by laser beams, infrared rays, temperature, pressure, image capturing, or the like. Alternatively, the wireless power system may identify the presence of a foreign material based on power loss between transmitted power and received power. However, the foregoing method has difficulty in detecting a foreign material, particularly when the foreign material is small relative to a power transmission coil. In addition, as transmission power is greater, power loss caused by the foreign material is smaller, thereby increasing the difficulty in detecting a foreign material.

SUMMARY

Provided is an electronic device for wirelessly transmitting power, which has an auxiliary coil in addition to a power transmission coil and senses a foreign material in a power transmission area by the auxiliary coil, and a method of operating the same.

Additional aspects will be set forth in part in the description which follows and, in part, will be apparent from the description, or may be learned by practice of the presented embodiments of the disclosure.

According to an aspect of an embodiment, an electronic device for wirelessly transmitting power includes a first coil assembly; a second coil assembly; and a processor configured to control to generate a first magnetic field by applying first current to the first coil assembly; obtain a plurality of first sensing values of the first magnetic field sensed by a plurality of coils included in the second coil assembly; and identify whether a foreign material exists in a power transmission area of the electronic device based on the plurality of first sensing values.

The processor is further configured to normalize the plurality of first sensing values by using a magnitude of the first current; compare each of the plurality of normalized first sensing values with a predetermined reference value; and identify whether the foreign material exists based on comparing each of the plurality of normalized first sensing values with the predetermined reference value.

The processor is further configured to compare the predetermined reference value with sensing values sensed by coils of a specific group from among the plurality of coils;

and based on a difference between the predetermined reference value and a sensing value sensed by at least one of the coils of the specific group being greater than a preset value, identify that the foreign material exists.

The processor is further configured to identify that the foreign material exists at a position corresponding to the at least one coil.

Based on each sensing value obtained from coils of a first group from among the plurality of coils increasing above the predetermined reference value, and each sensing value obtained from coils of a second group among the plurality of coils decreasing below the predetermined reference value, the processor is further configured to identify that the foreign material exists.

The processor is further configured to identify that the foreign material exists at a position corresponding to the coils of the second group.

The predetermined reference value is obtained in a presence of a wireless power receiver in the power transmission area, or is obtained in an absence of a wireless power receiver in the power transmission area.

The processor is further configured to, in an absence of a foreign material, apply a second current to the first coil assembly to output a second magnetic field externally to the electronic device; obtain a second sensing value of the second magnetic field from the second coil assembly; and obtain a reference value used to identify whether the foreign material exists, by normalizing the second sensing value using a magnitude of the second current.

The processor is further configured to obtain sensing values sensed by coils of a specific group from among the plurality of coils; compare sensing values obtained from adjacent coils of the specific group with each other; and based on a difference between the sensing values obtained from the adjacent coils being greater than a preset value, identify that the foreign material exists.

The first coil assembly comprises a coil configured to transmit power to a wireless power receiver, and the second coil assembly comprises the plurality of coils used to identify whether the foreign material exists. The second coil assembly is disposed on the first coil assembly.

According to an aspect of an example embodiment, a method of operating an electronic device for wirelessly transmitting power includes control to generate a first magnetic field by applying first current to a first coil of the electronic device; obtaining a plurality of first sensing values of the first magnetic field sensed by a plurality of coils included in a second coil assembly of the electronic device; and identifying whether a foreign material exists in a power transmission area of the electronic device based on the plurality of first sensing values.

The identifying of whether the foreign material exists comprises normalizing the plurality of first sensing values by using a magnitude of the first current; comparing each of the plurality of normalized first sensing values with a predetermined reference value; and identifying whether the foreign material exists based on comparing each of the plurality of normalized first sensing values with the predetermined reference value.

The identifying of whether the foreign material exists comprises comparing the predetermined reference value with sensing values sensed by coils of a specific group from among the plurality of coils; and based on a difference between the predetermined reference value and a sensing value sensed by at least one of the coils of the specific group being greater than a preset value, identifying that the foreign material exists.

The method further comprises identifying that the foreign material exists at a position corresponding to the at least one coil.

The identifying of whether the foreign material exists comprises, based on each sensing value obtained from coils of a first group from among the plurality of coils increasing above the reference value, and each sensing value obtained from coils of a second group from among the plurality of coils decreasing below the reference value, identifying that the foreign material exists.

The method further comprises identifying that the foreign material exists at a position corresponding to the coils of the second group.

The predetermined reference value is obtained in a presence of a wireless power receiver in the power transmission area, or is obtained in an absence of a wireless power receiver in the power transmission area.

The method further comprises in an absence of a foreign material, applying second current to the first coil assembly to output a second magnetic field externally to the electronic device; obtaining a second sensing value of the second magnetic field from the second coil assembly; and obtaining a reference value used to identify whether the foreign material exists, by normalizing the second sensing value using a magnitude of the second current.

The identifying of whether a foreign material exists comprises obtaining sensing values sensed by coils of a specific group from among the plurality of coils; comparing sensing values obtained from adjacent coils of the specific group with each other; and based on a difference between the sensing values obtained from the adjacent coils being greater than a preset value, identifying that the foreign material exists.

According to an aspect of an example embodiment, an electronic device for wirelessly transmitting power includes a first coil assembly; a second coil assembly; a memory configured to store instructions; and a processor configured to execute the instructions to control to generate a first magnetic field by applying first current to the first coil assembly; obtain a plurality of first sensing values of the first magnetic field sensed by a plurality of coils included in the second coil assembly; and identify whether a foreign material exists in a power transmission area of the electronic device based on the plurality of first sensing values.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 4D and 4E are diagrams illustrating sensing coils included in an auxiliary coil assembly according to various embodiments of the disclosure;

FIGS. 4F and 4G are diagrams illustrating sensing coils included in an auxiliary coil assembly according to various embodiments of the disclosure;

DETAILED DESCRIPTION

Figure 1:
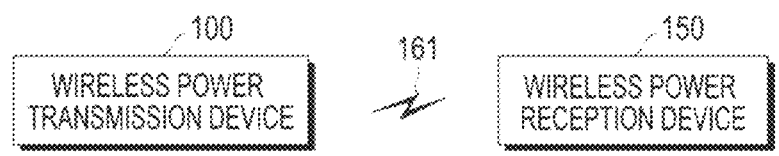
FIG. 1 is a block diagram illustrating a wireless power transmission device and a wireless power reception device according to various embodiments of the disclosure.

Various embodiments of the disclosure are described with reference to the accompanying drawings. However, the embodiments and terms used herein are not intended to limit the technical scope of the disclosure, and it is to be understood that the disclosure covers various modifications, equivalents, and/or alternatives. With regard to the description of the drawings, similar reference numerals may be used to refer to similar elements. Unless the context clearly dictates otherwise, singular forms include plural referents. In the disclosure, the terms "A or B" or "at least one of A and/or B" may cover all possible combinations of enumerated items. The terms "first," "second," etc., may be used for the names of various components irrespective of sequence and/or importance, and do not limit the components. These expressions are used to distinguish one component from another component. When it is said that a component (e.g., a first component) is "operatively or communicatively coupled with/to" or "connected to" another component (e.g., a second component), it should be understood that the one component is connected to the other component directly or through any other component (e.g., a third component).

The term "configured to" as used herein may be replaced with, for example, the terms "suitable for," "having the capacity to," "designed to," "adapted to," "made to," or "capable of" under some circumstances. The term "a device configured to" may mean that the device may be "capable of" performing one or more operations with another device or part under some circumstances. For example, "a processor designed (or configured) to execute A, B, and C" may mean a dedicated processor (e.g., an embedded processor) for performing the corresponding operations or a processor (e.g., a central processing unit (CPU) or an application processor) for performing the operations.

A wireless power transmission device (or wireless power transmitter) or a wireless power reception device (or wireless power receiver) according to various embodiments of the disclosure may include at least one of, for example, a smartphone, a tablet personal computer (PC), a mobile phone, a video phone, an e-book reader, a desktop PC, a laptop PC, a netbook PC, a workstation, a server, a personal digital assistant (PDA), a portable multimedia player (PMP), an MP3 player, mobile medical equipment, a camera, or a wearable device. The wearable device may include at least one of an accessory type (e.g., a watch, a ring, a bracelet, an ankle bracelet, a necklace, glasses, contact lenses, or a head-mounted device (HMD)), a fabric or clothes type (e.g., electronic clothes), an attached type (e.g., a skin pad or tattoo), or an implantable circuit. According to some embodiments of the disclosure, a wireless power transmission device or an electronic device may include at least one of, for example, a television, a set-top box wiredly or wirelessly interworking with a television, a digital versatile disk (DVD) player, an audio player, a refrigerator, an air conditioner, a vacuum cleaner, an oven, a microwave oven, a washer, an air purifier, a set-top box, a TV box, a home automation control panel, a security control panel, a media box, a gaming console, an electronic dictionary, an electronic key, a camcorder, an electric vehicle, or an electronic picture frame.

According to other embodiments of the disclosure, a wireless power transmission device (or wireless power transmitter) or a wireless power reception device (or wireless power receiver) may include at least one of a medical device (e.g., various portable medical meters (e.g., a blood glucose meter, a heart rate meter, a blood pressure meter, a body temperature meter, or the like), a magnetic resonance angiography (MRA) device, a magnetic resonance imaging (MRI) device, a computed tomography (CT) device, an imaging device, an ultrasonic device, or the like), a navigation device, a global navigation satellite system (GNSS), an event data recorder (EDR), a flight data recorder (FDR), an automotive infotainment device, a naval electronic device (e.g., a naval navigation device, a gyrocompass, or the like), an avionic electronic device, a security device, an in-vehicle head unit, an industrial or consumer robot, an automatic teller machine (ATM) in a financial facility, a point of sale (POS) device in a shop, or an Internet of things device (e.g., a lighting bulb, various sensors, a sprinkler, a fire alarm, a thermostat, a street lamp, a toaster, sports goods, a hot water tank, a heater, a boiler, or the like). According to some embodiments of the disclosure, a wireless power transmission device or an electronic device may include at least one of furniture, a part of a building/structure or a vehicle, an electronic board, an electronic signature receiving device, a projector, or various meters (e.g., a water, electricity, gas, or electro-magnetic wave meter). According to various embodiments of the disclosure, a wireless power transmission device or a wireless power reception device may be flexible or may be one or a combination of two or more of the foregoing devices. A wireless power transmission device or a wireless power reception device according to an embodiment of the disclosure is not limited to the foregoing devices. In the disclosure, the term "user" may refer to a person or device (e.g., artificial intelligence electronic device) that uses a wireless power transmission device or a wireless power reception device.

FIG. 1 is a block diagram illustrating a wireless power transmission device and a wireless power reception device according to various embodiments of the disclosure.

Referring to FIG. 1, a wireless power transmission device 100 according to various embodiments of the disclosure may transmit power wirelessly to at least one wireless power reception device 150. The wireless power transmission device 100 may transmit power 161 to the wireless power reception device 150 in any of various charging schemes. For example, the wireless power transmission device 100 may transmit the power 161 based on induction. When the wireless power transmission device 100 operates based on induction, the wireless power transmission device 100 may include, for example, a power source, a direct current (DC)-to-alternating current (AC) conversion circuit, an amplification circuit, an impedance matching circuit, at least one capacitor, at least one coil, and a communication modulation/demodulation circuit. The at least one capacitor together with the at least one coil may form a resonant circuit. The wireless power transmission device 100 may be implemented as defined in the wireless power consortium (WPC) standard (or Qi standard). For example, the wireless power transmission device 100 may transmit the power 161 based on resonance. When the wireless power transmission device 100 operates based on resonance, the wireless power transmission device 100 may include, for example, a power source, a DC-to-AC conversion circuit, an amplification circuit, an impedance matching circuit, at least one capacitor, at least one coil, and an out-band communication circuit (e.g., a Bluetooth low energy (BLE) communication circuit). The at least one capacitor and the at least one coil may form a resonant circuit. The wireless power transmission device 100 may be implemented as defined in the alliance for wireless power (A4WP) standard (or air fuel alliance (AFA) standard). The wireless power transmission device 100 may include a coil that generates an induced magnetic field, when current flows by resonance or induction. A process of generating an induced magnetic field by the wireless power transmission device 100 may amount to wireless transmission of the power 161 from the wireless power transmission device 110. Further, the wireless power transmission device 100 may include a coil that generates induced electromotive force by a nearby magnetic field with a magnitude changing over time. A process of generating induced electromotive force through a coil by the wireless power reception device 150 may amount to wireless reception of the power 161 in the wireless power reception device 150. For example, the wireless power transmission device 100 may transmit the power 161 based on electromagnetic waves. When the wireless power transmission device 100 operates based on electromagnetic waves, the wireless power transmission device 100 may include, for example, a power source, a DC-to-AC conversion circuit, an amplification circuit, a division circuit, a phase shifter, a power transmission antenna array including a plurality of patch antennas, and an out-band communication circuit (e.g., a BLE communication module). Each of the plurality of patch antennas may form a radio frequency (RF) wave. The wireless power reception device 150 may include a patch antenna that outputs current by using an RF wave generated around the patch antenna. A process of forming RF waves by the wireless power transmission device 100 may amount to wireless transmission of the power 161 from the wireless power transmission device 100. A process of outputting current from a patch antenna by using RF waves in the wireless power reception device 150 may amount to wireless reception of the power 161 in the wireless power reception device 150.

According to various embodiments of the disclosure, the wireless power transmission device 100 may communicate with the wireless power reception device 150. For example, the wireless power transmission device 100 may communicate with the wireless power reception device 150 in an in-band scheme. The wireless power transmission device 100 or the wireless power reception device 150 may change the load (or impedance) of transmission data, for example, by on/off keying modulation. The wireless power transmission device 100 or the wireless power reception device 150 may identify transmission data from the other device by measuring a load variation (or impedance variation) based on a variation in the magnitude of the current, voltage, or power of a coil. For example, the wireless power transmission device 100 may communicate with the wireless power reception device 150 in an out-band scheme. The wireless power transmission device 100 or the wireless power reception device 150 may transmit and receive data by a communication circuit (e.g., a BLE communication module) configured separately from a coil or a patch antenna. The wireless power transmission device 100 may also transmit media data. Depending on the implementation, each of a plurality of different communication circuits (e.g., a BLE communication module, a wireless fidelity (Wi-Fi) module, and a wireless gigabit alliance (Wi-Gig) module) may transmit and receive media data and a wireless power transmission/reception control signal in the wireless power transmission device 100.

Figure 2:
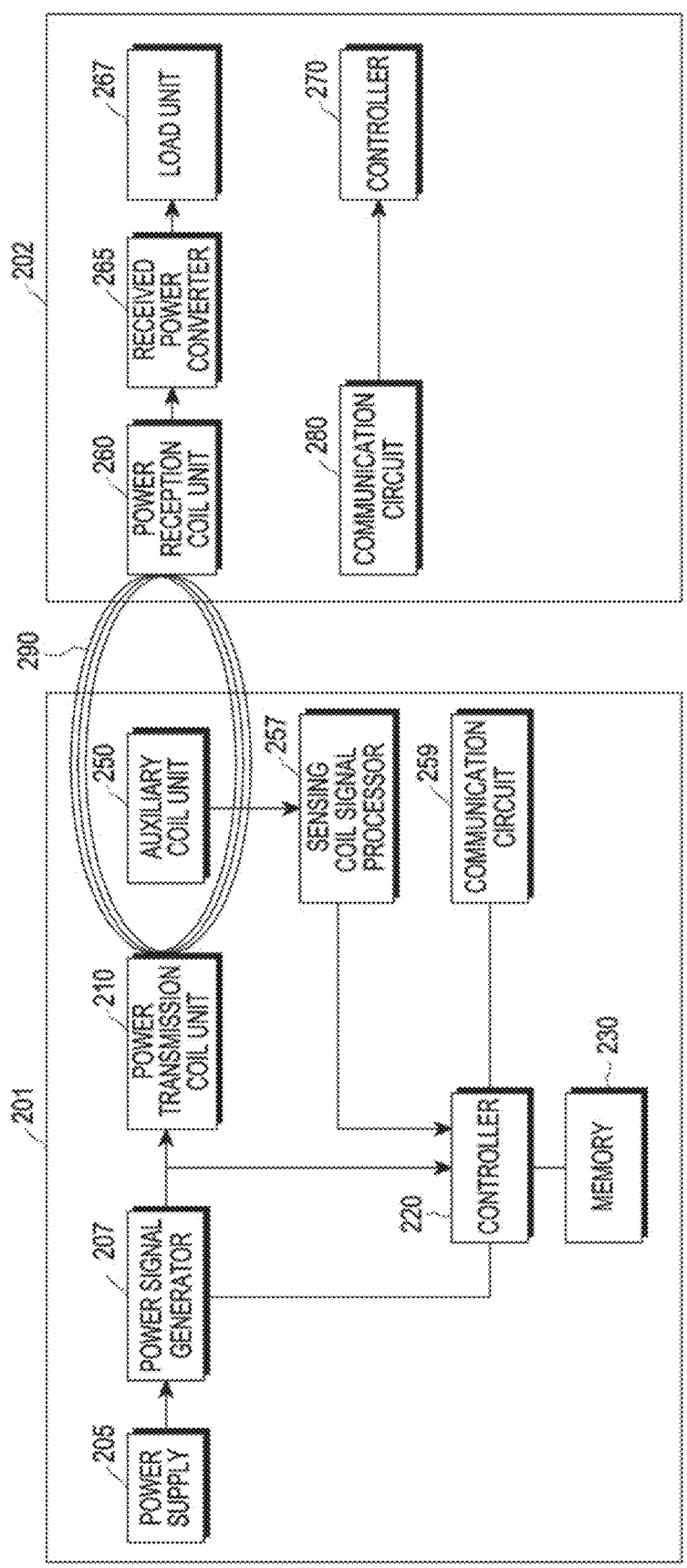
FIG. 2 is a block diagram illustrating a wireless power system according to various embodiments of the disclosure.

FIG. 2 is a block diagram illustrating a wireless power system according to various embodiments of the disclosure.

Referring to FIG. 2, the wireless power system may include a first electronic device 201 that transmits wireless power and a second electronic device 202 that receives wireless power.

According to various embodiments of the disclosure, the first electronic device 201 may have the same configuration as or a similar configuration to that of the wireless power transmission device 100 illustrated in FIG. 1. The first electronic device 201 may include a power supply 205, a power signal generator 207, a power transmission coil assembly 210, a controller 220, a memory 230, an auxiliary coil assembly 250, a sensing coil signal processor 257, and a communication circuit 259.

According to various embodiments of the disclosure, the first electronic device 201 may apply current to the power transmission coil assembly 210 by power supplied to the power supply 205, and output a magnetic field externally to the electronic device 201 through the power transmission coil assembly 210. The first electronic device 201 may identify whether there is a foreign material in a power transmission area of the first electronic device 201 based on sensing values of a magnetic field sensed through a plurality of coils included in the auxiliary coil assembly 250.

According to various embodiments, the first electronic device 201 may wirelessly transmit power to the second electronic device 202 through the power transmission coil assembly 210 based on at least one of induction, resonance, or electromagnetic waves. For example, the power transmission coil assembly 210 may include a power transmission coil.

According to various embodiments of the disclosure, the power signal generator 207 may receive power from the power supply 205, convert the received power to, for example, an AC waveform or amplify the received power, and then provide the converted or amplified power to the power transmission coil assembly 210, under the control of the controller 220. When power is supplied to the power transmission coil assembly 210, an induced magnetic field 290 with a magnitude changing over time may be generated from the power transmission coil assembly 210, thus transmitting power wirelessly. While not shown, capacitors forming a resonant circuit along with the power transmission coil assembly 210 may further be included. A resonant frequency may be defined by the standards. The resonant frequency may be 100 to 205 kHz in the Qi standard based on induction, and 6.78 MHz in the AFA standard based on resonance.

According to various embodiments of the disclosure, the controller 220 may provide overall control to the first electronic device 201. For example, the controller 220 may control the magnitude of power transmitted from the power transmission coil assembly 210. For example, the controller 220 may control the magnitude of power output from the power supply 205 or control the amplification gain of a power amplifier included in the power transmission coil assembly 210, to control the magnitude of the power transmitted from the power transmission coil assembly 210. The controller 220 may adjust the magnitude of power output from a power source by controlling the duty cycle or frequency of the power output from the power supply 205. The controller 220 may control the magnitude of power supplied to the power transmission coil assembly 210 by controlling the magnitude of a bias voltage of the power amplifier. The controller 220 or a controller 270 may be configured as various circuits that perform computations, such as a generic-purpose processor like a CPU, a mini computer, a microprocessor, a micro controlling unit (MCU), and a field programmable gate array (FPGA), not limited to any particular type. The controller 220 may control at least one of, for example, the power supply 205 or the power transmission coil assembly 210 to transmit power with a determined magnitude.

According to various embodiments of the disclosure, the controller 220 may receive information about the magnitude (or power value) of the power supplied to the power transmission coil assembly 210 by the power signal generator 207.

According to various embodiments of the disclosure, the controller 220 may sense the magnetic field 290 output from the power transmission coil assembly 210 by using the auxiliary coil assembly 250. The auxiliary coil assembly 250 may sense the effect of a foreign material in an area in which the magnetic field 290 is generated (e.g., a power transmittable area of the first electronic device 201) on the magnetic field 290. Therefore, the controller 220 may identify whether there is a foreign material in the area in which the magnetic field 290 is generated (e.g., the power transmittable area of the first electronic device 201) based on a sensing value of the magnetic field 290 sensed by the auxiliary coil assembly 250.

According to various embodiments of the disclosure, the auxiliary coil assembly 250 may include a plurality of sensing coils. The plurality of sensing coils may induce a voltage in proportion to a coil size, the number of turns, and the strength of the magnetic field 290. For example, each of the plurality of sensing coils may be designed to fully measure (or sense) the magnetic field 290 between the power transmission coil assembly 210 and a power reception coil assembly 260. For example, the sizes of the plurality of sensing coils may be determined according to the size of the magnetic field 290. When the magnetic field 290 is of a size causing a metal foreign material to emit heat, the sensing coils should be configured large enough to sense the magnetic field 290. Further, the plurality of sensing coils may be shaped in correspondence with the shape of the magnetic field 290. One sensing coil may be wound such that turns overlap with each other over one or more layers. Further, the sensing position of one sensing coil may overlap with that of another sensing coil and/or another layer.

According to various embodiments of the disclosure, the auxiliary coil assembly 250 may be located near to a foreign material to accurately sense the effect of the foreign material on the magnetic field 290. For example, the auxiliary coil assembly 250 may be located between the power transmission coil assembly 210 and the power reception coil assembly 260. For example, the auxiliary coil assembly 250 may be located on the power transmission coil assembly 210 and as close as possible to the product surface of the first electronic device 201.

According to various embodiments of the disclosure, the sensing coil signal processor 257 may process sensing values sensed by the plurality of sensing coils included in the auxiliary coil assembly 250 and provide the processed data to the controller 220. For example, the sensing coil signal processor 257 may process a voltage induced from each of the plurality of sensing coils included in the auxiliary coil assembly 250 to a voltage value or data representing the voltage value. The controller 220 may identify whether there is a foreign material in the area in which the magnetic field 290 is generated (e.g., the power transmittable area of the first electronic device 201) based on the data received from the sensing coil signal processor 257.

According to various embodiments of the disclosure, the controller 220 may obtain a reference value by normalizing the sensing values of the plurality of sensing coils in the auxiliary coil assembly 250 in a specific state, for example, in the presence or absence of a target power receiver in the power transmission area. For example, the controller 220 may obtain a normalized reference value by dividing the sensing values sensed by the plurality of sensing coils in the auxiliary coil assembly 250 by a current value applied to the power transmission coil assembly 210. For example, the reference value may be a value normalized with respect to the sensing coils of the auxiliary coil assembly 250 in a foreign material-free state.

According to various embodiments of the disclosure, the controller 220 may identify whether there is a foreign material in the power transmission area by comparing the reference value with the normalized values of the sensing values received from the auxiliary coil assembly 250.

According to various embodiments of the disclosure, the memory 230 may store instructions to operate the first electronic device 200. The controller 220 may store the reference value for the specific state in the memory 230. The memory 230 may be configured as various types including read only memory (ROM), random access memory (RAM), or flash memory, not limited to any particular type.

The first electronic device 201 may further include a sensor (not shown) that senses an area around the first electronic device 201. The controller 220 may identify whether the second electronic device 202 (or wireless power receiver) is located in the area around the first electronic device 201 through the sensor. For example, as far as it is capable of sensing data used to identify whether the second electronic device 202 (or wireless power receiver) is located in the area around the first electronic device 201, any means may be used as the sensor. The sensor may be configured as any of various types including a communication circuit, a camera, a proximity sensor, and an ultrasonic sensor.

The second electronic device 202 may have a configuration substantially identical or similar to that of the wireless power reception device 150 illustrated in FIG. 1. The second electronic device 202 may include the power reception coil assembly 260, a received power converter 265, a load unit 267, the controller 270, and a communication circuit 280.

According to various embodiments of the disclosure, the power reception coil assembly 260 may receive power wirelessly from the power transmission coil assembly 210 based on at least one of induction, resonance, or electromagnetic waves. The received power converter 265 may perform power processing such as rectifying the power of a received AC waveform to a DC waveform, converting a voltage, or regulating power. The load unit 267 may include various hardware devices that consume the received power. The controller 270 may provide overall control to the second electronic device 202. The communication circuit 280 may transmit and receive information related to wireless power transmission and reception.

Figure 3A:
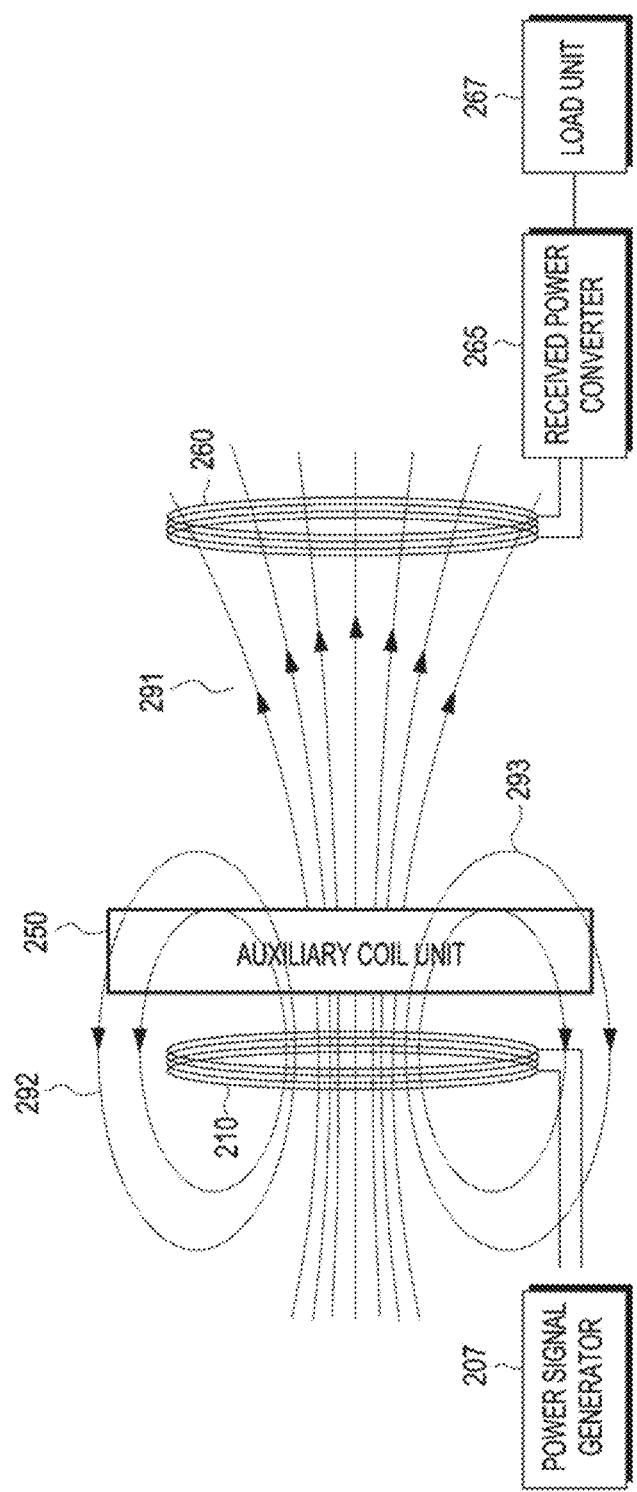
FIG. 3A is a block diagram illustrating a magnetic field output from a power transmission coil assembly and an auxiliary coil assembly that senses the magnetic field according to various embodiments of the disclosure.

FIG. 3A is a block diagram illustrating a magnetic field output from the power transmission coil assembly and the auxiliary coil assembly sensing the magnetic field according to various embodiments of the disclosure.

Referring to FIG. 3A, the auxiliary coil assembly 250 may sense a magnetic field (the magnetic field 290 of FIG. 2) output from the transmission coil assembly 210. For example, the magnetic field (the magnetic field 290 of FIG. 2) may include a plurality of magnetic flux lines (e.g., magnetic flux lines 291, 292, and 293). The plurality of sensing coils included in the auxiliary coil assembly 250 may be designed to fully measure (or sense) the magnetic field 290 or the plurality of magnetic flux lines 291, 292, and 293 between the power transmission coil assembly 210 and the power reception coil assembly 260. When the magnetic field 290 is of a size that causes a metal foreign material to emit heat, the auxiliary coil assembly 250 should be configured to be large enough to sense the magnetic field 290. For example, the plurality of sensing coils included in the auxiliary coil assembly 250 may be located on extension lines of the plurality of magnetic flux lines 291, 292 and 293. Further, the plurality of sensing coils included in the auxiliary coil assembly 250 may be designed to have a diameter larger than a height at which a foreign material to be sensed is located by twice or more times. For each of the plurality of sensing coils included in the auxiliary coil assembly 250, the number of turns may be determined such that a voltage induced in the sensing coil is lower than a maximum voltage that the sensing coil signal processor 257 is capable of sensing or processing.

According to various embodiments of the disclosure, the auxiliary coil assembly 250 may be located close to a foreign material in order to accurately sense the effect of the foreign material on the magnetic field 290. For example, the auxiliary coil assembly 250 may be located between the power transmission coil assembly 210 and the power reception coil assembly 260. That is, the auxiliary coil assembly 250 may be located close to the surface of the electronic product.

Figure 3B:
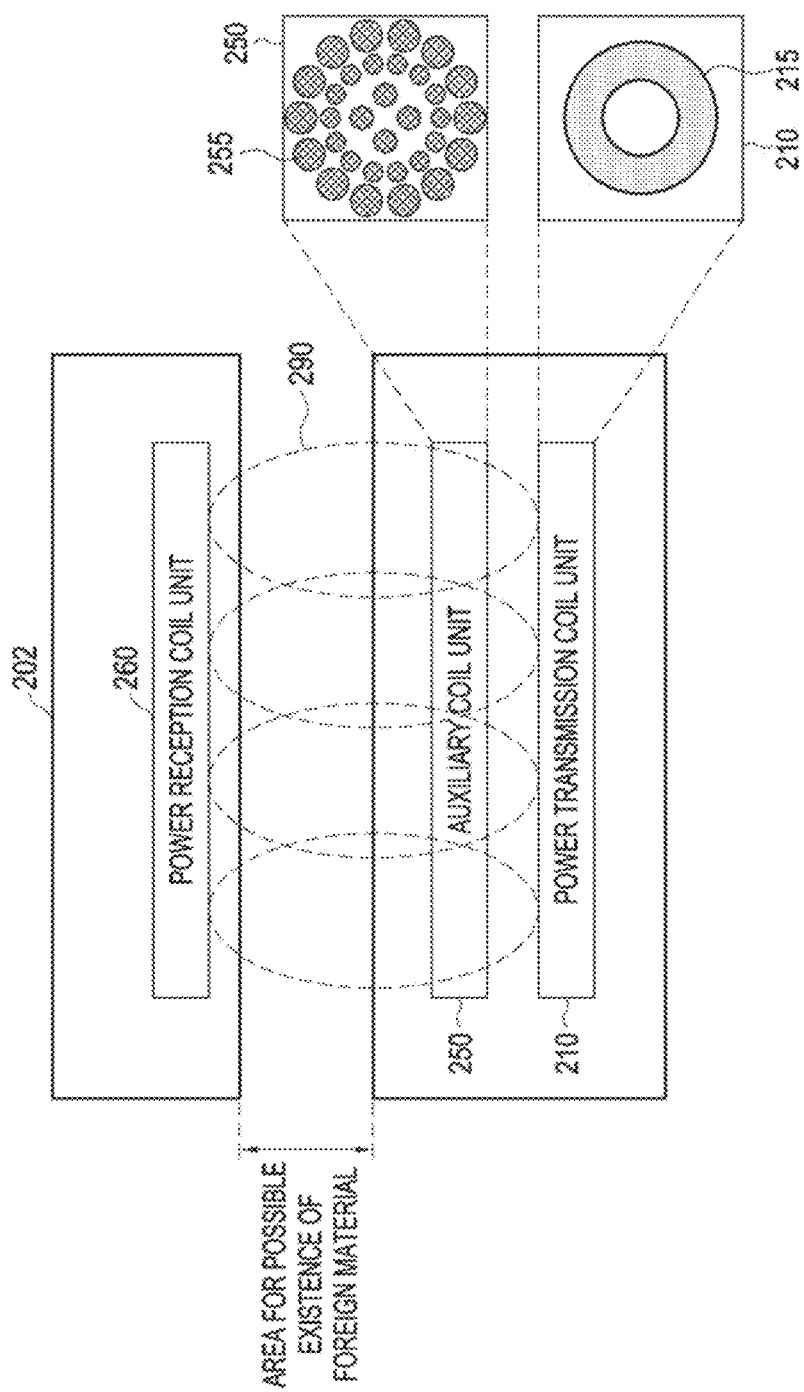
FIG. 3B is a block diagram illustrating arrangement of a power transmission coil assembly and an auxiliary coil assembly according to various embodiments of the disclosure.
Figure 3C:
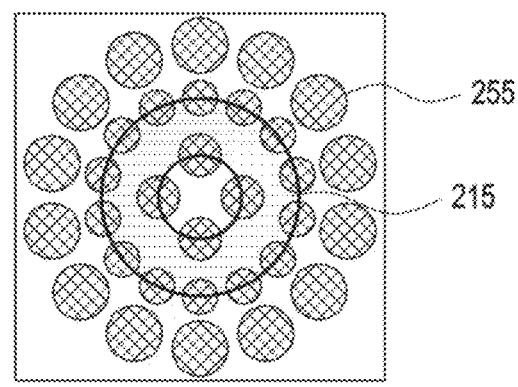
FIG. 3C is a diagram illustrating arrangement of a power transmission coil assembly and an auxiliary coil assembly based on the shape of a magnetic field of a power transmission coil according to various embodiments of the disclosure.

FIG. 3B is a diagram illustrating arrangement of the power transmission coil assembly and the auxiliary coil assembly according to various embodiments of the disclosure. FIG. 3C is a diagram illustrating arrangement of the power transmission coil assembly and the auxiliary coil assembly based on the shape of a magnetic field from a power transmission coil according to various embodiments of the disclosure.

Referring to FIG. 3B, according to various embodiments of the disclosure, the power transmission coil assembly 210 may include a power transmission coil 215. The power transmission coil 215 may output the magnetic field 290 including a plurality of magnetic flux lines. For example, a foreign material may exist in the power transmission area between the power transmission coil assembly 210 and the power reception coil assembly 260. The foreign material may refer to a substance that interferes with power transmission. For example, the foreign material may include a metal and/or a non-metal.

According to various embodiments of the disclosure, the auxiliary coil assembly 250 may include a plurality of sensing coils 255. Each of the plurality of sensing coils 255 may be designed to fully measure (or sense) the magnetic field 290 applied between the power transmission coil assembly 210 and the power reception coil assembly 260. For example, the size of each of the plurality of sensing coils 255 may be determined in correspondence with the size and shape of the magnetic field 290. That is, among the plurality of sensing coils 255, sensing coils located in a specific area may have the same size and shape. Among the plurality of sensing coils 255, sensing coils located in different areas may have different sizes and shapes.

According to various embodiments of the disclosure, the auxiliary coil assembly 250 may be positioned on the power transmission coil assembly 210 in order to accurately sense the effect of the foreign material on the magnetic field 290. For example, the plurality of sensing coils 255 may be positioned on the power transmission coil 215 in the shape illustrated in FIG. 3C.

Figure 4A:
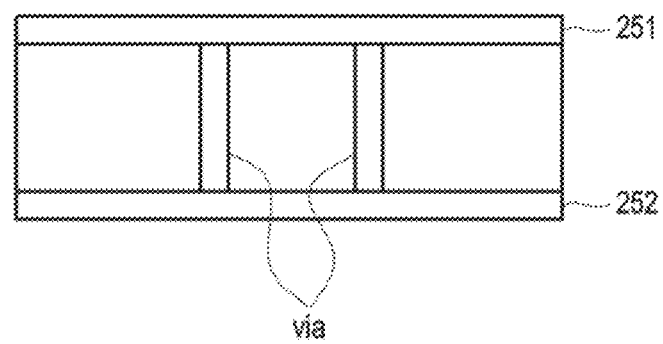
FIG. 4A is a diagram illustrating an auxiliary coil assembly according to various embodiments of the disclosure.

FIG. 4A is a diagram illustrating the auxiliary coil assembly according to various embodiments of the disclosure.

Referring to FIG. 4A, the auxiliary coil assembly 250 may include at least one layer. For example, the auxiliary coil assembly 250 may include a first layer 251 and a second layer 252 with a printed circuit board (PCB) in between. In this case, the first layer 251 and the second layer 252 may be connected to each other through vias.

Figure 4B:
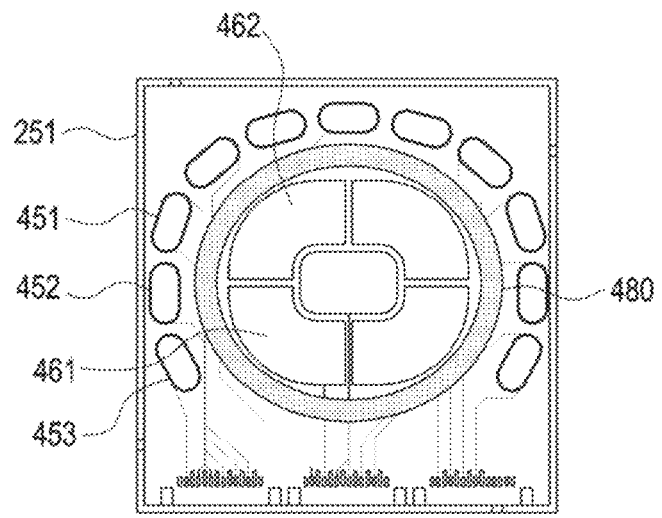
FIGS. 4B and 4C are diagrams illustrating a plurality of sensing coils included in an auxiliary coil assembly according to various embodiments of the disclosure.
Figure 4C:
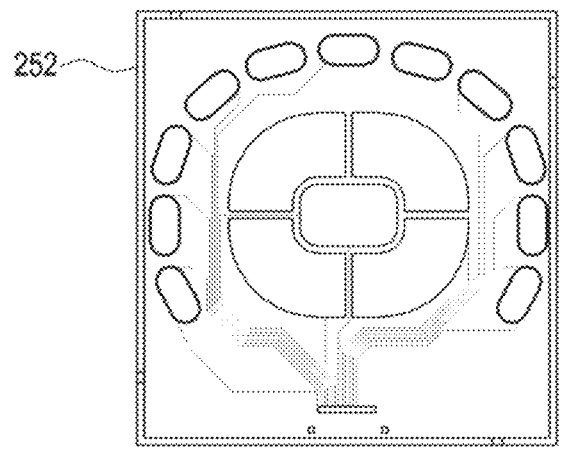

FIGS. 4B and 4C are diagrams illustrating a plurality of sensing coils included in the auxiliary coil assembly according to various embodiments of the disclosure.

Referring to FIG. 4B, the first layer 251 may include a plurality of sensing coils. Referring to FIG. 4C, the second layer 252 may include a plurality of sensing coils. The plurality of sensing coils of the first layer 251 may be symmetrical with the plurality of sensing coils of the second layer 252, respectively.

Referring to FIGS. 4B and 4C, the plurality of sensing coils may be implemented in consideration of the shape of the magnetic field 290 between the power transmission coil 210 and the power reception coil 260. For example, since the inside of the loop of the power transmission coil 210 has more magnetic flux lines than the outside thereof, the magnetic field 290 may be strong. Accordingly, the sizes of the sensing coils of the auxiliary coil assembly 250 for sensing the inside of the power transmission coil 210 may be relatively large, and the number of turns of the sensing coils may be relatively small. On the contrary, since the outside of the loop of the power transmission coil 210 has fewer magnetic flux lines than the inside thereof, the magnetic field 290 may be weak. Accordingly, the sizes of the sensing coils of the auxiliary coil assembly 250 for sensing the outside of the power transmission coil 210 may be relatively small, and the number of turns may be relatively large.

According to various embodiments of the disclosure, among the plurality of sensing coils, sensing coils that sense magnetic fields of similar sizes may be designed to have the same or similar shape or size to obtain similar sensing values. For example, among the plurality of sensing coils, outer sensing coils (e.g., sensing coils 451, 452, 453, etc.) may have the same or similar shapes or sizes. Further, center sensing coils (e.g., sensing coils 461, 462, etc.) among the plurality of sensing coils may have the same or similar shapes or sizes. For example, among the plurality of sensing coils, sensing coils that sense magnetic fields of similar sizes may be set as a specific group, for control and management. For example, the outer sensing coils (e.g., the sensing coils 451, 452, and 453, etc.) among the plurality of sensing coils may be grouped into a first group, and the center sensing coils (e.g., the sensing coils 461, 462, etc.) among the plurality of sensing coils may be grouped into a second group.

According to various embodiments of the disclosure, although the auxiliary coil assembly 250 senses the vertical magnetic field 290 output from the power transmission coil 210, there may be a shading area 480 through which the vertical magnetic field 290 does not actually pass. For example, an area in which the power transmission coil 210 is located may be the shading area 480 in which a horizontal magnetic field is dominant without the vertical magnetic field. The auxiliary coil assembly 250 may include sensing coils perpendicular to other adjacent sensing coils so as to sense the horizontal magnetic field in the shading area 480.

FIGS. 4D and 4E are diagrams illustrating sensing coils included in the auxiliary coil assembly according to various embodiments of the disclosure.

Referring to FIGS. 4D and 4E, a first sensing coil illustrated in FIG. 4D may be any one of the plurality of sensing coils located in the first layer 251, and a second sensing coil illustrated in FIG. 4E may be any one of the plurality of sensing coils located in the second layer 252. The first sensing coil and the second sensing coil may be symmetrical with each other and connected to each other through vias.

According to various embodiments of the disclosure, the first sensing coil and the second sensing coil may be implemented as thin copper wires. The first sensing coil and the second sensing coil may be wound in the same direction. For example, the winding direction may be a counterclockwise direction.

According to various embodiments of the disclosure, each of the sensing coils may be connected to the sensing coil signal processor through a positive signal line and a negative signal line, and the positive signal line and the negative signal line may be as close as possible (e.g., with a distance of 0.1 mm or less).

According to various embodiments of the disclosure, the negative signal lines of the sensing coils may be bound into a single line and connected to the sensing coil signal processor 257. Alternatively, one of the positive signal line and the negative signal line of each of the sensing coils may be tied to the ground and connected to the sensing coil signal processor 257.

FIGS. 4F and 4G are diagrams illustrating sensing coils included in the auxiliary coil assembly according to various embodiments of the disclosure.

Referring to FIGS. 4F and 4G, a third sensing coil illustrated in FIG. 4F may be any one of the sensing coils located in the shading area 480 in the first layer 251, and a fourth sensing coil illustrated in FIG. 4G may be any one of a plurality of sensing coils located in the shading area in the second layer 252. The third sensing coil and the fourth sensing coil may be symmetrical with each other and connected to each other through vias. In the shading area 480, since the magnetic field 290 (or the magnetic flux lines) is mostly directed in the horizontal direction, the third sensing coil and the fourth sensing coil may be designed to be directed in perpendicular to adjacent other sensing coils to sense the horizontal magnetic field.

The shapes, sizes, numbers, and positions of the sensing coils included in the auxiliary coil assembly 250 illustrated in FIGS. 3 and 4 are merely exemplary for the convenience of description, and do not limit the technical features of the disclosure.

In relation to a method of operating the first electronic device 201 described below, the operation of the first electronic device 201 may be controlled by the controller 220. For example, the controller 220 may be responsible for the operation of the first electronic device 201 described below.

Figure 5:
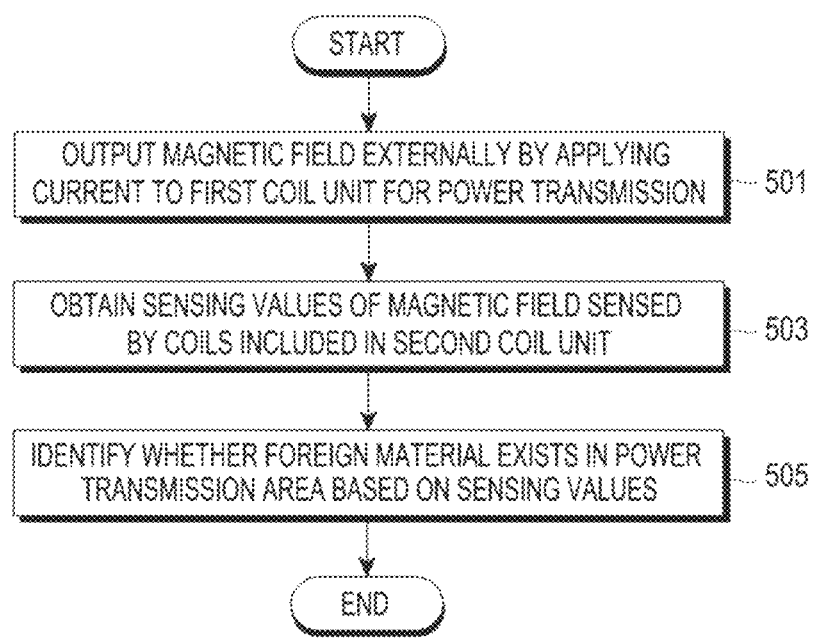
FIG. 5 is a flowchart illustrating a method of sensing a foreign material in an electronic device for wirelessly transmitting power according to various embodiments of the disclosure.

FIG. 5 is a flowchart illustrating a method of sensing a foreign material in an electronic device for wirelessly transmitting power according to various embodiments of the disclosure.

Referring to FIG. 5, according to various embodiments of the disclosure, a first electronic device (e.g., the first electronic device 201 of FIG. 2) may output a magnetic field (e.g., the magnetic field 290 of FIG. 2) by applying current to a first coil assembly for power transmission (e.g., the power transmission coil assembly 210 of FIG. 2) in operation 501.

According to various embodiments of the disclosure, the first electronic device 201 may obtain sensing values of the magnetic field sensed by a plurality of coils (e.g., the sensing coils of FIG. 2) included in a second coil assembly (e.g., the auxiliary coil assembly 250 of FIG. 2) in operation 503. For example, the sensing values may be voltage values induced to the plurality of coils by the magnetic field.

According to various embodiments of the disclosure, the first electronic device 201 may identify whether a foreign material exists in a power transmission area of the first electronic device (for example, the area between the first electronic device 201 and the second electronic device 202) based on the sensing values in operation 505.

According to various embodiments of the disclosure, when identifying that there is a foreign material, the first electronic device 201 may discontinue power transmission. When identifying that there is a foreign material, the first electronic device 201 may provide a notification by using visual, tactile, and/or auditory means. For example, the first electronic device 201 may display a notification message on a display or may provide an alarm by vibration or sound.

Figure 6:
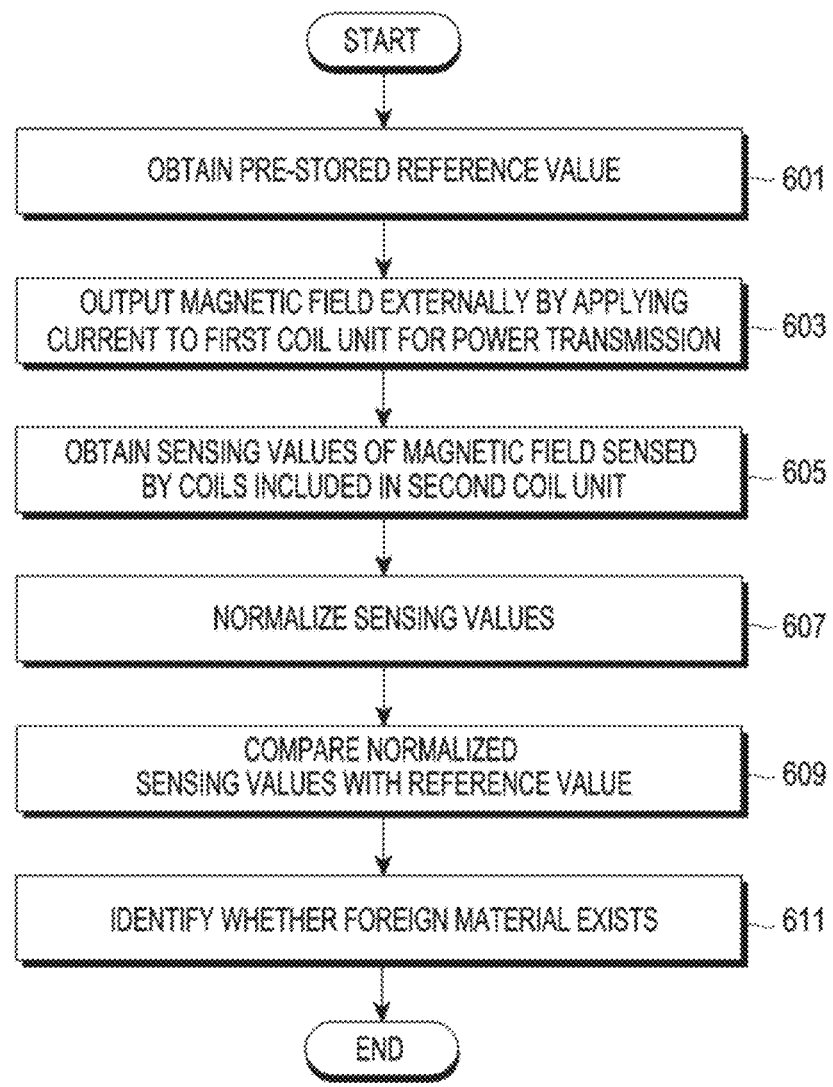
FIG. 6 is a flowchart illustrating a method of sensing a foreign material in an electronic device for wirelessly transmitting power according to various embodiments of the disclosure.

With reference to FIG. 6, an operation of detecting a foreign material by the first electronic device 201 will be described below in greater detail.

FIG. 6 is a flowchart illustrating a method of sensing a foreign material in an electronic device for wirelessly transmitting power according to various embodiments of the disclosure.

Referring to FIG. 6, a first electronic device (e.g., the first electronic device 201 of FIG. 2) may obtain a pre-stored reference value to identify whether a foreign material exists in operation 601. For example, the reference value may mean a value obtained by normalizing sensing values obtained from a plurality of sensing coils included in a second coil assembly (e.g., the auxiliary coil assembly 250 of FIG. 2) in a foreign material-free state. For example, the reference value may be a value experimentally obtained in a manufacturing stage of the first electronic device 201. Alternatively, the reference value may be a value obtained from a user input in a product configuration stage of the first electronic device 201. Alternatively, the reference value may be a value automatically determined when the first electronic device 201 is initially operated.

According to various embodiments of the disclosure, the first electronic device 201 may output a magnetic field (e.g., the magnetic field 290 of FIG. 2) externally to the first electronic device by applying current to a first coil assembly for power transmission (e.g., the power transmission coil assembly 210) in operation 603.

According to various embodiments of the disclosure, the first electronic device 201 may obtain sensing values of the magnetic field 290 sensed from the plurality of coils included in the second coil assembly 250 in operation 605.

According to various embodiments of the disclosure, the first electronic device 201 may normalize the obtained sensing values in operation 607. For example, the first electronic device 201 may normalize the sensing values by dividing the sensing values sensed by the second coil assembly 250 by the magnitude (e.g., current value) of the current applied to the first coil assembly 210.

According to various embodiments of the disclosure, the first electronic device 201 may compare the normalized sensing values with the reference value in operation 609. In operation 611, the first electronic device 201 may identify whether a foreign material exists in the power transmission area of the first electronic device 201 based on the result of the comparison. For example, if the difference between at least one of the normalized sensing values and the reference value is greater than a preset value, the first electronic device 201 may identify that a foreign material exists.

In the above-described method, even though sensing values sensed through the second coil assembly 250 change according to the strength of the magnetic field output from the first coil assembly 210, the first electronic device 201 may accurately identify the presence of a foreign material by using normalized values.

Figure 7:
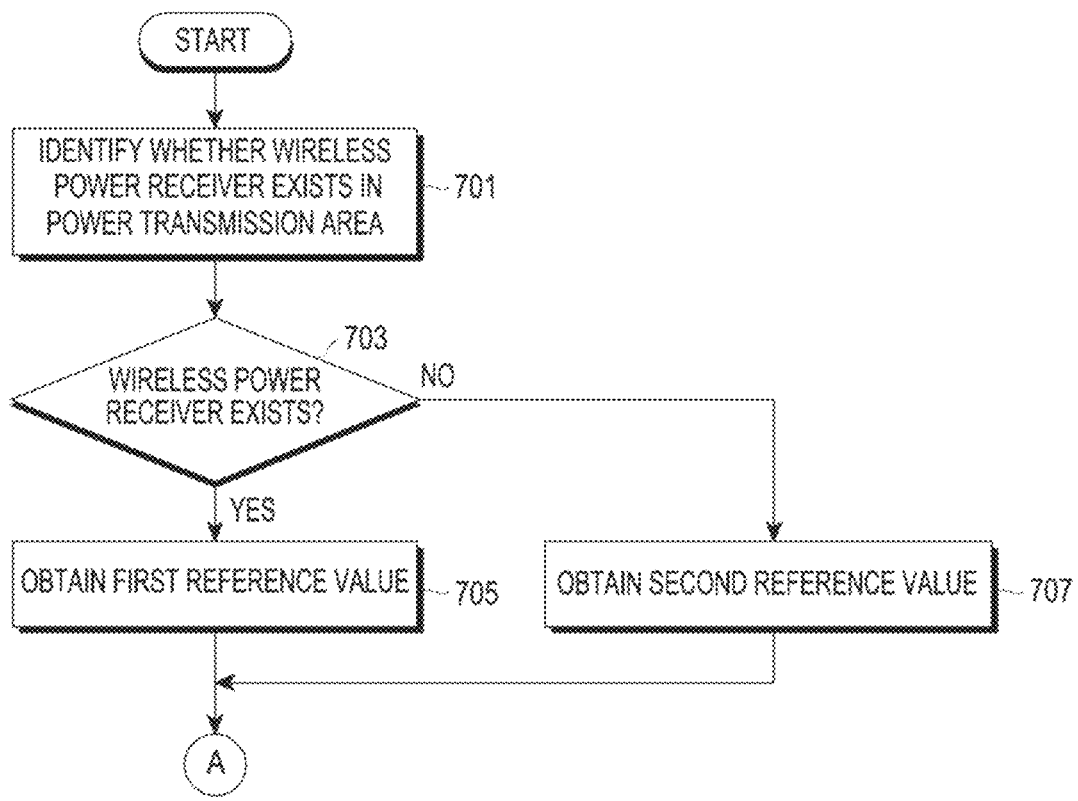
FIG. 7 is a flowchart illustrating a method of obtaining a reference value in an electronic device for wirelessly transmitting power according to various embodiments of the disclosure.

FIG. 7 is a flowchart illustrating a method of obtaining a reference value in an electronic device for wirelessly transmitting power according to various embodiments of the disclosure.

Referring to FIG. 7, according to various embodiments of the disclosure, before identifying the presence or absence of a foreign material, a first electronic device (e.g., the first electronic device 201 of FIG. 2) may identify whether a second electronic device (e.g., the second electronic device 202 of FIG. 2) (or wireless power receiver) is located in the power transmission area of the first electronic device 201 in operation 701. For example, the first electronic device 201 may identify whether the second electronic device (or wireless power receiver) is located in the power transmission area by a user input or automatically. The first electronic device 201 may identify whether the second electronic device 202 is located in the power transmission area through a communication circuit (e.g., the communication circuit 259 of FIG. 2) or a proximity sensor.

According to various embodiments of the disclosure, if the second electronic device (or wireless power receiver) is located in the power transmission area ("YES" in operation 703), the first electronic device 201 may obtain a first reference value from a memory (e.g., the memory 230 in FIG. 2) in operation 705. For example, the first reference value may mean a value obtained by normalizing sensing values obtained from a plurality of sensing coils included in a second coil assembly (e.g., the auxiliary coil assembly 250 of FIG. 2) when the second electronic device (or wireless power receiver) is located in the power transmission area.

According to various embodiments of the disclosure, if the second electronic device (or wireless power receiver) is not located in the power transmission area ("NO" in operation 703), the first electronic device 201 may obtain a second reference value from the memory (e.g., the memory 230 of FIG. 2) in operation 707. For example, the second reference value may be a value obtained by normalizing sensing values obtained from the plurality of sensing coils included in the second coil assembly (e.g., the auxiliary coil assembly 250 of FIG. 2) when the second electronic device (or wireless power receiver) is not located in the power transmission area. For example, the second reference value may be different from the first reference value.

According to various embodiments of the disclosure, the first electronic device 201 may identify whether a foreign substance exists by obtaining an appropriate reference value according to whether the second electronic device 202 (or the wireless power receiver) is located in the power transmission area.

As described above, the first electronic device 201 may generate or obtain a reference value in a foreign material-free state. An embodiment of generating a reference value in the first electronic device 201 will be described below.

Figure 8:
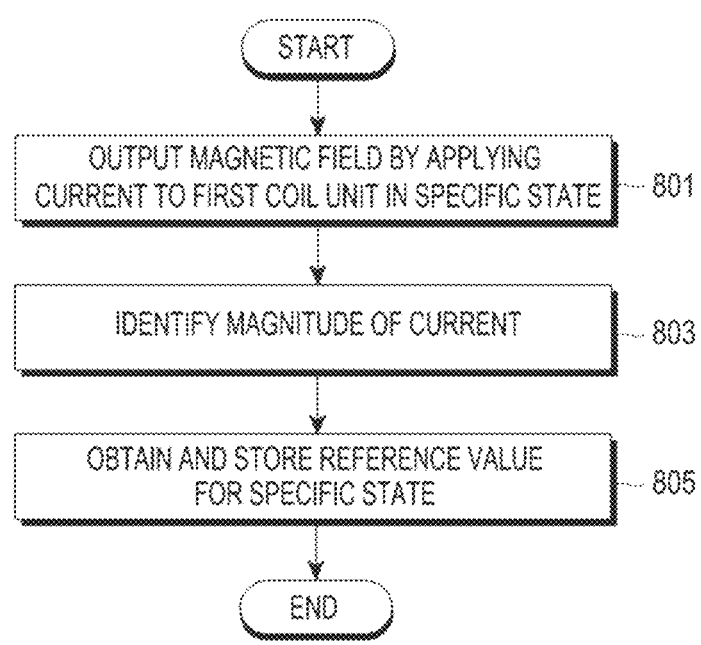
FIG. 8 is a flowchart illustrating a method of obtaining a reference value in an electronic device for wirelessly transmitting power according to various embodiments of the disclosure.

FIG. 8 is a flowchart illustrating a method of obtaining a reference value in an electronic device for wirelessly transmitting power according to various embodiments of the disclosure.

Referring to FIG. 8, according to various embodiments of the disclosure, when there is no pre-stored reference value, a first electronic device (e.g., the first electronic device 201 of FIG. 2) may output a magnetic field externally to the first electronic device by applying current to a first coil assembly (e.g., the power transmission coil assembly 210 of FIG. 2) in a specific state in operation 801. Alternatively, even when updating a pre-stored reference value, the first electronic device 201 may also output a magnetic field externally to the first electronic device 201 by applying current to the first coil assembly in the specific state. For example, the specific state may be a state in which a second electronic device (e.g., the second electronic device 202 of FIG. 2) (or a wireless power receiver) is or is not located in the power transmission area of the first electronic device 201.

According to various embodiments of the disclosure, the first electronic device 201 may sense a magnetic field output from the first coil assembly 210 through a second coil assembly (e.g., the auxiliary coil assembly 250 of FIG. 2), and obtain sensing values.

According to various embodiments of the disclosure, the first electronic device 201 may identify the magnitude (or current value) of the current applied to the first coil assembly 210 in operation 803.

According to various embodiments of the disclosure, the first electronic device 201 may obtain a reference value for the specific state by using the magnitude of the current applied to the first coil assembly 210 and the sensing values obtained from the second coil assembly 250 in operation 805. For example, the first electronic device 201 may generate or obtain the reference value by normalizing the sensing values with the magnitude of the current. The first electronic device 201 may store the obtained reference value in a memory (e.g., the memory 230 of FIG. 2).

According to various embodiments of the disclosure, the first electronic device 201 may use the reference value obtained in the above method, when identifying whether a foreign material is present.

Figure 9A:
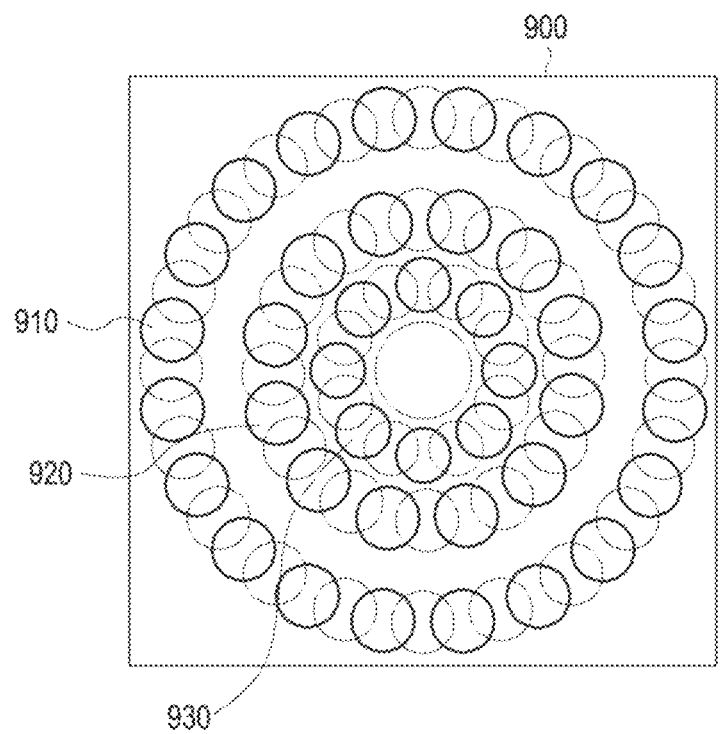
FIGS. 9A, 9B and 9C are diagrams illustrating a method of sensing a foreign material through an auxiliary coil assembly in an electronic device according to various embodiments of the disclosure.
Figure 9B:
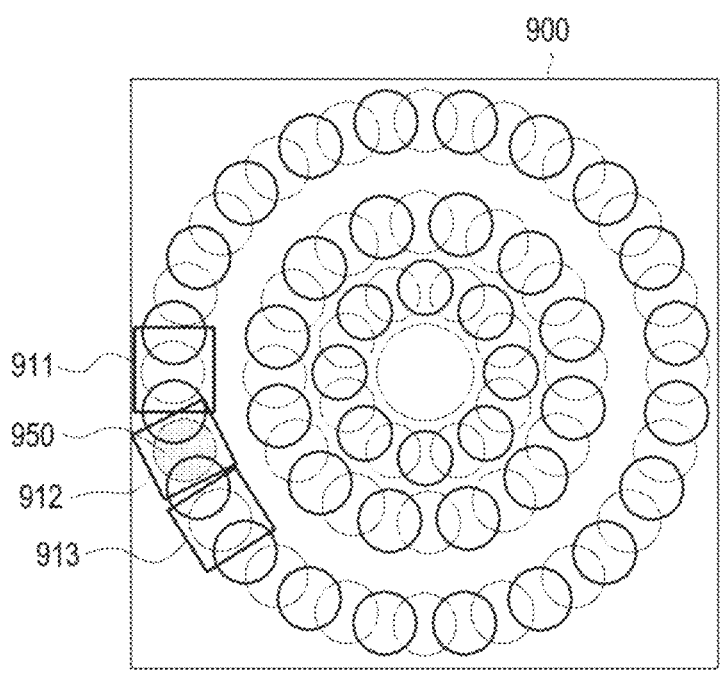
Figure 9C:
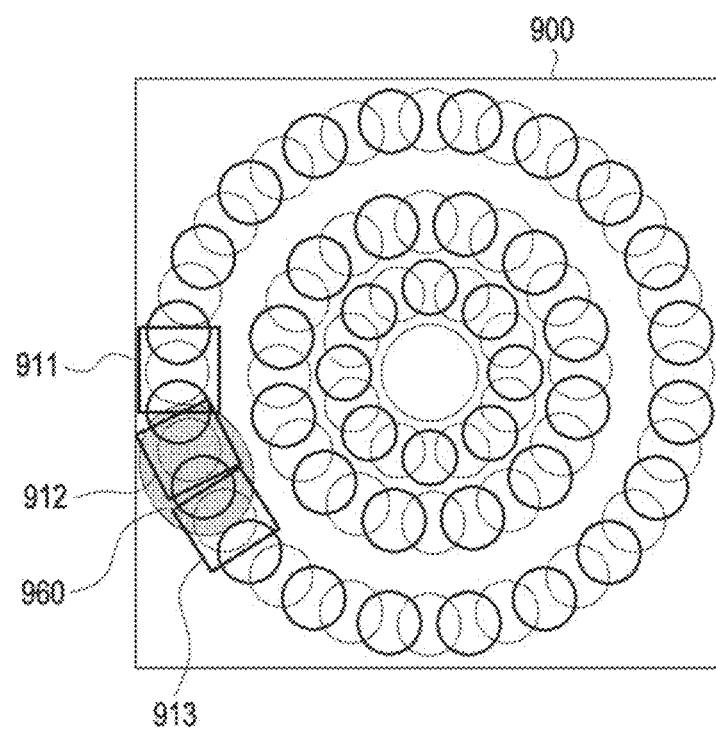

FIGS. 9A, 9B, and 9C are diagrams describing a method of sensing a foreign material through an auxiliary coil assembly in an electronic device according to various embodiments of the disclosure.

Referring to FIG. 9A, according to various embodiments of the disclosure, an auxiliary coil assembly 900 (e.g., the auxiliary coil assembly 250 of FIG. 2) may include a plurality of coils (or sensing coils). For example, the plurality of coils may be grouped into a plurality of groups according to their positions and shapes. The plurality of groups may be divided into a first group 910, a second group 920, and a third group 930. For example, the coils of the first group 910 may be located at an outer portion of the auxiliary coil assembly 900, the coils of the third group 930 may be located at the center of the auxiliary coil assembly 900, and the coils of the second group 920 may be interposed between the first group 910 and the third group 930. The coils of the same group may be designed to measure the same magnetic field (or magnetic flux line). Accordingly, each of the coils included in the same group may obtain a similar sensing value.

Referring to FIG. 9B, the first group may include a plurality of channels that obtain sensing values. Each of the plurality of channels may be configured as two coils overlapping with each other. Further, each of the plurality of channels may measure a sensing value of a magnetic field. For example, the first group may include a first channel 911, a second channel 912, and a third channel 913.

According to various embodiments of the disclosure, a foreign material 950 may be located in the area of the second channel 912. Since the foreign material 950 blocks the area of the second channel 912, a magnetic field (or magnetic flux line) may not pass through the area of the second channel 912. The magnetic field (or magnetic flux line) that has not passed through the area of the second channel 912 may be dispersed around the second channel 912. For example, in a state in which the foreign material 950 is not present, a first electronic device (e.g., the first electronic device 201 of FIG. 2) may measure values of '100', '101', and '100', respectively in the first channel 911, the second channel 912, and the third channel 913. On the other hand, in a state in which the foreign material 950 is present, the first electronic device 201 may measure values of '110', '70', and '109' respectively in the first channel 911, the second channel 912, and the third channel 913. That is, the existence of the foreign material 950 may increase the measurements of the first channel 911 and the third channel 913 and decrease the measurement of the second channel 912.

Referring to FIG. 9C, according to various embodiments of the disclosure, a foreign material 960 may be located in the area of the second channel 912 and a partial area of the third channel 913. Since the foreign material 960 blocks the area of the second channel 912 and the partial area of the third channel 913, a magnetic field (or magnetic flux line) may not pass through the area of the second channel 912 and the partial area of the third channel 913. In this case, the magnetic field (or magnetic flux line) that has not passed through the area of the second channel 912 and the partial area of the third channel 913 may be dispersed to the surroundings. For example, in a state in which the foreign material 960 is not present, a first electronic device (e.g., the first electronic device 201 of FIG. 2) may measure values of '100', '101', and '100', respectively in the first channel 911, the second channel 912, and the third channel 913. On the other hand, in a state in which the foreign material 960 is present, the first electronic device 201 may measure values of '112', '70', and '80' respectively in the first channel 911, the second channel 912, and the third channel 913. That is, the existence of the foreign material 960 may increase the measurement of the first channel 911 and decrease the measurements of the second channel 912 and the third channel 913.

Figure 10:
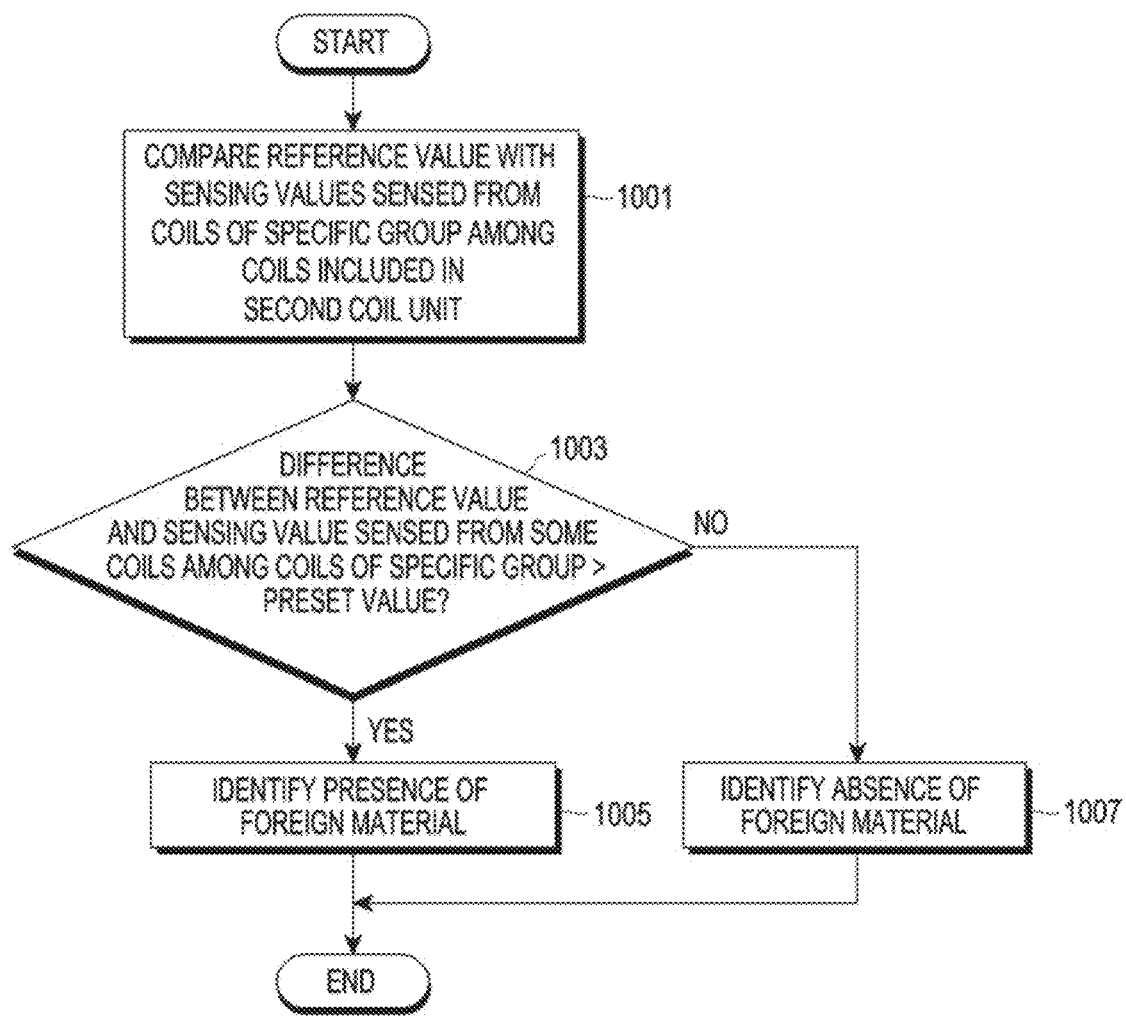
FIG. 10 is a flowchart illustrating a method of sensing a foreign material through an auxiliary coil assembly in an electronic device according to various embodiments of the disclosure.

FIG. 10 is a flowchart illustrating a method of sensing a foreign material through an auxiliary coil assembly in an electronic device according to various embodiments of the disclosure.

Referring to FIG. 10, according to various embodiments of the disclosure, a first electronic device (the first electronic device 201 of FIG. 2) may obtain sensing values sensed by a specific group of coils included in a second coil assembly (e.g., the auxiliary coil assembly 250 of FIG. 5) for a magnetic field output from a first coil assembly (e.g., the power transmission coil assembly 210 of FIG. 2) and compare the obtained sensing values with a reference value in operation 1001. For example, the first electronic device 201 may compare the reference value with measurements from the first channel 911, the second channel 912, and the third channel 913 of a first group (e.g., the first group 910 in FIGS. 9A, 9B and 9C). For example, the reference value may be '100'.

According to various embodiments of the disclosure, the first electronic device 201 may identify whether the difference between a sensing value sensed from some of the coils of the specific group and the reference value is greater than a preset value. For example, the preset value may be set automatically or by a user input in operation 1003.

According to various embodiments of the disclosure, when the difference between the sensing value sensed from some of the coils of the specific group and the reference value is greater than the preset value ("YES" in operation 1003), the first electronic device 201 may identify that a foreign material exists in the power transmission area in operation 1005. For example, the first electronic device 201 may measure values of '110', '70', and '109' respectively in the first channel 911, the second channel 912, and the third channel 913 of a first group (e.g., the first group 910 of FIG. 9). For example, if the preset value is 20, the first electronic device 201 may identify that a foreign material exists because the measurement of the second channel 912 is less than the reference value '100' by '30'.

According to various embodiments of the disclosure, the first electronic device 201 may identify not only the presence of a foreign material, but also a rough position of the foreign material. For example, the first electronic device 201 may identify that the foreign material is located in the area of the second channel 912. The first electronic device 201 may provide information about the presence of the foreign material and the position of the foreign material on the display.

According to various embodiments of the disclosure, when the difference between the sensing value sensed from the coil among the coils of the specific group and the reference value is equal to or less than the preset value ("NO" in operation 1003), the first electronic device 201 may identify that there is no foreign material in the power transmission area in operation 1007. For example, the first electronic device 201 may measure values of '100', '101', and '100' respectively in the first channel 911, the second channel 912, and the third channel 913 of the first group 910. For example, if the preset value is 20, the first electronic device 201 may identify that no foreign material exists.

Figure 11:
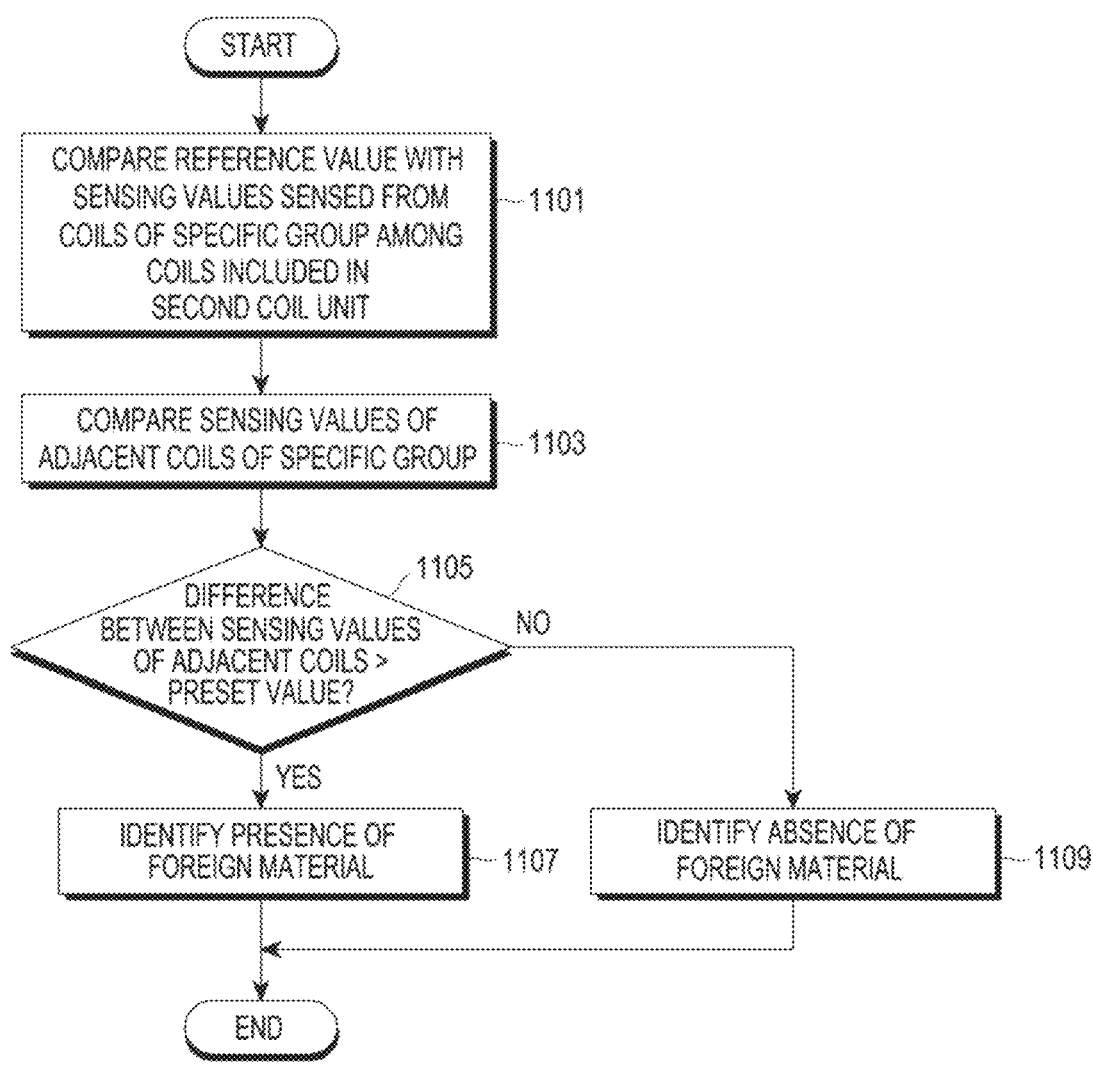
FIG. 11 is a flowchart illustrating a method of sensing a foreign material through an auxiliary coil assembly in an electronic device according to various embodiments of the disclosure.

FIG. 11 is a flowchart illustrating a method of sensing a foreign material through an auxiliary coil assembly in an electronic device according to various embodiments of the disclosure.

Referring to FIG. 11, according to various embodiments of the disclosure, a first electronic device (the first electronic device 201 of FIG. 2) may obtain sensing values sensed by a specific group of coils included in a second coil assembly (e.g., the auxiliary coil assembly 250 of FIG. 5) for a magnetic field output from a first coil assembly (e.g., the power transmission coil assembly 210 of FIG. 2) in operation 1101. For example, the first electronic device 201 may obtain measurements from the first channel 911, the second channel 912, and the third channel 913 of a first group (e.g., the first group 910 in FIG. 9).

According to various embodiments of the disclosure, the first electronic device 201 may compare sensing values of adjacent coils in the specific group in operation 1103. For example, the first electronic device 201 may compare the measurements of the first channel 911, the second channel 912, and the third channel 913 in the first group 901 with each other.

According to various embodiments of the disclosure, the first electronic device 201 identify whether the difference between the sensing values sensed from the adjacent coils among the coils of the specific group is greater than a preset value in operation 1105. For example, the preset value may be set automatically or by a user input.

According to various embodiments of the disclosure, when the difference between the sensing values from the adjacent coils is greater than the preset value ("YES" in operation 1105), the first electronic device 201 may identify that a foreign material exists in the power transmission area in operation 1107. For example, the first electronic device 201 may measure values of '110', '70', and '109' respectively in the first channel 911, the second channel 912, and the third channel 913 of a first group (e.g., the first group 910 of FIG. 9). For example, if the preset value is 20, the first electronic device 201 may identify that a foreign material exists because the difference between the measurements of the first channel 911 and the second channel 912 is greater than '20'.

According to various embodiments of the disclosure, when the difference between the sensing values from the adjacent coils is equal to or less than the preset value ("NO" in operation 1105), the first electronic device 201 may identify that no foreign material exists in the power transmission area in operation 1109. For example, the first electronic device 201 may measure values of '100', '101', and '100' respectively in the first channel 911, the second channel 912, and the third channel 913 of the first group 910. For example, if the preset value is 20, the first electronic device 201 may identify that no foreign material exists.

Figure 12A:
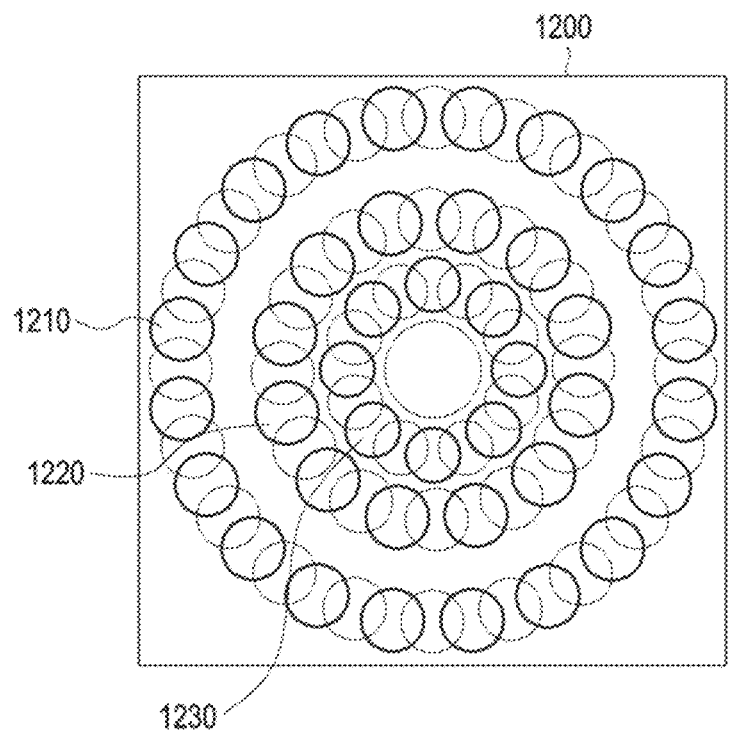
FIGS. 12A and 12B are diagrams illustrating a method of sensing a foreign material through an auxiliary coil assembly in an electronic device according to various embodiments of the disclosure.
Figure 12B:
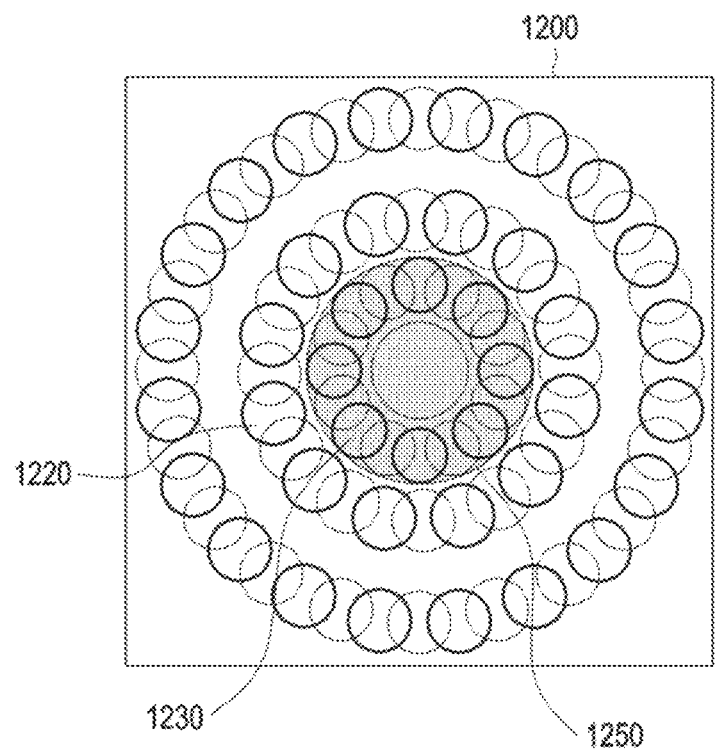

FIGS. 12A and 12B are diagrams illustrating a method of sensing a foreign material through an auxiliary coil assembly in an electronic device according to various embodiments of the disclosure.

Referring to FIG. 12A, according to various embodiments of the disclosure, an auxiliary coil assembly 1200 (e.g., the auxiliary coil assembly 250 of FIG. 2) may include a plurality of coils (or sensing coils). For example, the plurality of coils may be grouped into a plurality of groups according to their positions and shapes. The plurality of coils may be divided into a first group 1210, a second group 1220, and a third group 1230. For example, the coils of the first group 1210 may be located at an outer portion of the auxiliary coil assembly 1200, the coils of the third group 1230 may be located at the center of the auxiliary coil assembly 1200, and the coils of the second group 1220 may be interposed between the first group 1210 and the third group 1230. The coils of the same group may be designed to measure the same magnetic field (or magnetic flux line). Accordingly, each of the coils included in the same group may obtain a similar sensing value.

Referring to FIG. 12B, according to various embodiments of the disclosure, a foreign material 1250 may be located at the center of the auxiliary coil assembly 1200, including the area of the third group 1230. Since the foreign material 1250 blocks the entire area of the third group 1230, a magnetic field (or magnetic flux line) may not pass through the area of the third group 1230. The magnetic field (or magnetic flux line) that has not passed through the area of the third group 1230 may be dispersed around the area. For example, in a state in which the foreign material 1250 is present, the first electronic device 201 may measure a larger value than when the foreign material 1250 is not located in the second group 1220 and a smaller value than when the foreign material 1250 is not present in the third group 1230. That is, the existence of the foreign material 1250 may increase the overall measurements of the coils of the second group 1220 and decrease the overall measurements of the coils of the third group 1230.

Figure 13:
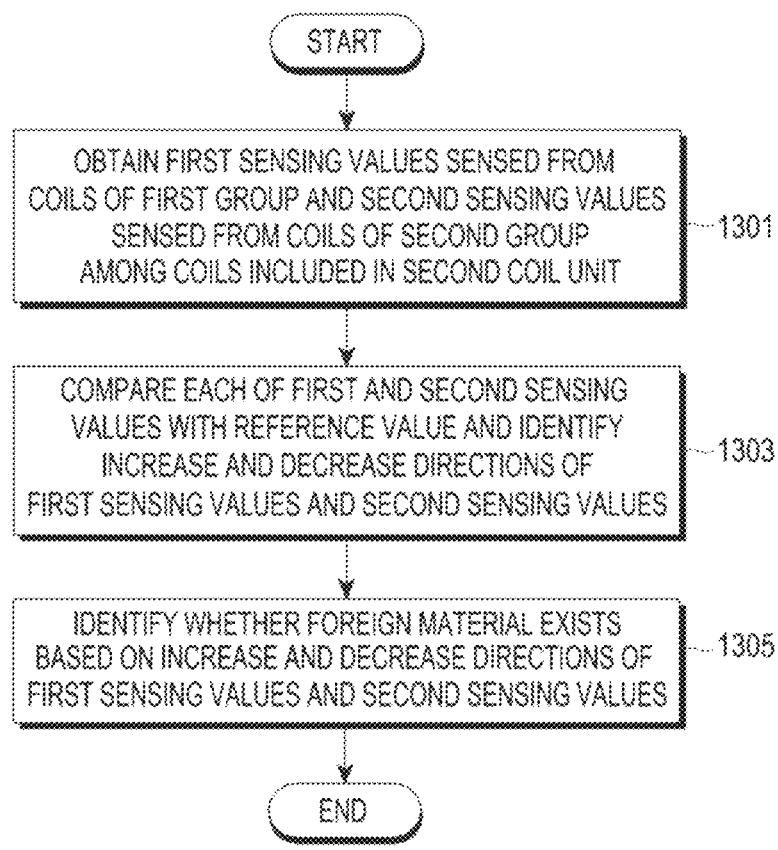
FIG. 13 is a flowchart illustrating a method of sensing a foreign material through an auxiliary coil assembly in an electronic device according to various embodiments of the disclosure.

FIG. 13 is a flowchart illustrating a method of sensing a foreign material through an auxiliary coil assembly in an electronic device according to various embodiments of the disclosure.

Referring to FIG. 13, according to various embodiments of the disclosure, a first electronic device (the first electronic device 201 of FIG. 2) may obtain first sensing values sensed by the coils of a first group and second sensing values sensed by the coils of a second group among a plurality of coils included in a second coil assembly (e.g., the auxiliary coil assembly 250 of FIG. 2) for a magnetic field output from a first coil assembly (e.g., the power transmission coil assembly 210 of FIG. 2) in operation 1301. For example, the first group may correspond to the group 1220 of FIGS. 12A and 12B, and the second group may correspond to the group 1230 of FIGS. 12A and 12B.

According to various embodiments of the disclosure, the first electronic device 201 may compare a reference value with each of the first sensing values and the second sensing values, and determine an increase or decrease direction of the first sensing values and the second sensing values in operation 1303. For example, if the reference value is '100', the first sensing values may be values approximate to '130', and the second sensing values may be values approximate to '70'. That is, the first electronic device 201 may identify that the first sensing values have been increased and the second sensing values have been decreased.

According to various embodiments of the disclosure, the first electronic device 201 may identify whether a foreign material exists based on the increase and decrease directions of the first sensing values and the second sensing values in operation 1305. For example, as the first electronic device 201 identifies that the first sensing values are increased on the whole and the second sensing values are decreased on the whole, the first electronic device 201 may identify that a foreign material exists in the power transmission area.

According to various embodiments of the disclosure, the first electronic device 201 may identify not only the presence or absence of a foreign material, but also a rough position of the foreign material. For example, as the first electronic device 201 identifies that the first sensing values are increased on the whole and the second sensing values are decreased on the whole, the first electronic device 201 may identify that there is a foreign material in an area corresponding to the second group, for example, the area corresponding to the third group 1230 of FIGS. 12A and 12B. The first electronic device 201 may provide information about the presence of a foreign material and the position of the foreign material on the display.

The first electronic device 201 may identify whether a foreign material exists in the power transmission area using at least one of the methods described before with reference to FIGS. 5 to 13.

According to various embodiments of the disclosure, an electronic device for wirelessly transmitting power may include a first coil assembly; a second coil assembly; and a processor configured to control to generate a first magnetic field by applying first current to the first coil assembly; obtain a plurality of first sensing values of the first magnetic field sensed by a plurality of coils included in the second coil assembly; and identify whether a foreign material exists in a power transmission area of the electronic device based on the plurality of first sensing values.

The processor may be configured to normalize the plurality of first sensing values by using a magnitude of the first current; compare each of the plurality of normalized first sensing values with a predetermined reference value; and identify whether the foreign material exists based on comparing each of the plurality of normalized first sensing values with the predetermined reference value.

The processor may compare the predetermined reference value with sensing values sensed by coils of a specific group from among the plurality of coils; and based on a difference between the predetermined reference value and a sensing value sensed by at least one of the coils of the specific group being greater than a preset value, identify that the foreign material exists.

The processor may be configured to identify that the foreign material exists at a position corresponding to the at least one coil.

Based on each sensing value obtained from coils of a first group from among the plurality of coils increasing above the predetermined reference value, and each sensing value obtained from coils of a second group among the plurality of coils decreasing below the predetermined reference value, the processor may be configured to identify that the foreign material exists.

The processor may be configured to identify that the foreign material exists at a position corresponding to the coils of the second group.

The predetermined reference value may be obtained in a presence of a wireless power receiver in the power transmission area, or may be obtained in an absence of a wireless power receiver in the power transmission area.

The processor may be configured to, in an absence of a foreign material, apply a second current to the first coil assembly to output a second magnetic field externally to the electronic device; obtain a second sensing value of the second magnetic field from the second coil assembly; and obtain a reference value used to identify whether the foreign material exists, by normalizing the second sensing value using a magnitude of the second current.

The processor may be configured to obtain sensing values sensed by coils of a specific group from among the plurality of coils; compare sensing values obtained from adjacent coils of the specific group with each other; and based on a difference between the sensing values obtained from the adjacent coils being greater than a preset value, identify that the foreign material exists.

The first coil assembly may include a coil configured to transmit power to a wireless power receiver, and the second coil assembly may include the plurality of coils used to identify whether the foreign material exists. The second coil assembly may be disposed on the first coil assembly.

A method of operating an electronic device for wirelessly transmitting power may include controlling to generate a first magnetic field by applying first current to a first coil of the electronic device; obtaining a plurality of first sensing values of the first magnetic field sensed by a plurality of coils included in a second coil assembly of the electronic device; and identifying whether a foreign material exists in a power transmission area of the electronic device based on the plurality of first sensing values.

The identifying of whether the foreign material exists may include normalizing the plurality of first sensing values by using a magnitude of the first current; comparing each of the plurality of normalized first sensing values with a predetermined reference value; and identifying whether the foreign material exists based on comparing each of the plurality of normalized first sensing values with the predetermined reference value.

The identifying of whether the foreign material exists may include comparing the predetermined reference value with sensing values sensed by coils of a specific group from among the plurality of coils; and based on a difference between the predetermined reference value and a sensing value sensed by at least one of the coils of the specific group being greater than a preset value, identifying that the foreign material exists.

The method may include identifying that the foreign material exists at a position corresponding to the at least one coil.

The identifying of whether the foreign material exists may include, based on each sensing value obtained from coils of a first group from among the plurality of coils increasing above the reference value, and each sensing value obtained from coils of a second group from among the plurality of coils decreasing below the reference value, identifying that the foreign material exists.

The method may include identifying that the foreign material exists at a position corresponding to the coils of the second group.

The predetermined reference value may be obtained in a presence of a wireless power receiver in the power transmission area, or may be obtained in an absence of a wireless power receiver in the power transmission area.

The method may include, in an absence of a foreign material, applying second current to the first coil assembly to output a second magnetic field externally to the electronic device; obtaining a second sensing value of the second magnetic field from the second coil assembly; and obtaining a reference value used to identify whether the foreign material exists, by normalizing the second sensing value using a magnitude of the second current.

The identifying of whether a foreign material exists may include obtaining sensing values sensed by coils of a specific group from among the plurality of coils; comparing sensing values obtained from adjacent coils of the specific group with each other; and based on a difference between the sensing values obtained from the adjacent coils being greater than a preset value, identifying that the foreign material exists.

An electronic device for wirelessly transmitting power may include a first coil assembly; a second coil assembly; a memory configured to store instructions; and a processor configured to execute the instructions to control to generate a first magnetic field by applying first current to the first coil assembly; obtain a plurality of first sensing values of the first magnetic field sensed by a plurality of coils included in the second coil assembly; and identify whether a foreign material exists in a power transmission area of the electronic device based on the plurality of first sensing values.

As is apparent from the foregoing description, an electronic device for wirelessly transmitting power according to various embodiments of the disclosure includes an auxiliary coil in addition to a power transmission coil. The electronic device may effectively sense a foreign material located in a power transmission area through the auxiliary coil.

Each of the afore-described components of the electronic device may include one or more components, and the name of the corresponding components may vary according to the type of the electronic device. In various embodiments, the electronic device may be configured to include at least one of the above-described components. Some components may be omitted in or other components may be added to the electronic device. In addition, some of the components of the electronic device according to various embodiments may be combined into a single entity, so that functions of the corresponding components before the combination may be performed in the same manner.

The embodiments disclosed herein are provided to describe and help the understanding of the technical content, not limiting the scope of the present disclosure. Therefore, the scope of the present disclosure should be interpreted as encompassing all modifications or various other embodiments based on the technical idea of the present disclosure.

What is claimed is:

1. An electronic device for wirelessly transmitting power, the electronic device comprising:
   a first coil assembly;
   a second coil assembly including a plurality of coils, the second coil assembly being positioned between the first coil assembly and an external wireless power receiver; and
   a processor configured to:
   control the first coil assembly to generate a first magnetic field by applying first current to the first coil assembly;
   obtain a plurality of first sensing values of the first magnetic field sensed by the plurality of coils included in the second coil assembly; and
   identify whether a foreign material exists in a power transmission area of the electronic device based on the plurality of first sensing values,
   wherein the processor is further configured to:
   identify whether the external wireless power receiver exists in the power transmission area of the electronic device;
   obtain a reference value based on identifying whether the external wireless power receiver exists in the power transmission area of the electronic device; and
   identify whether the foreign material exists in the power transmission area of the electronic device further based on the obtained reference value,
   wherein the processor is further configured to obtain a first value as the reference value based on the external wireless power receiver existing in the power transmission area of the electronic device, and obtain a second value as the reference value based on the external wireless power receiver not existing in the power transmission area of the electronic device, the first value being different from the second value.

2. The electronic device of claim 1, wherein the processor is further configured to:
   normalize the plurality of first sensing values by using a magnitude of the first current;
   compare each of the plurality of normalized first sensing values with the reference value; and
   identify whether the foreign material exists based on comparing each of the plurality of normalized first sensing values with the reference value.

3. The electronic device of claim 2, wherein the processor is further configured to:
   compare the reference value with sensing values sensed by coils of a specific group from among the plurality of coils; and
   based on a difference between the reference value and a sensing value sensed by at least one of the coils of the specific group being greater than a preset value, identify that the foreign material exists.

4. The electronic device of claim 3, wherein the processor is further configured to identify that the foreign material exists at a position corresponding to the at least one coil.

5. The electronic device of claim 2, wherein based on each sensing value obtained from coils of a first group from among the plurality of coils increasing above the reference value, and each sensing value obtained from coils of a second group among the plurality of coils decreasing below the reference value, the processor is further configured to identify that the foreign material exists.

6. The electronic device of claim 5, wherein the processor is further configured to identify that the foreign material exists at a position corresponding to the coils of the second group.

7. The electronic device of claim 1, wherein the processor is further configured to:
   in an absence of the foreign material, apply a second current to the first coil assembly to output a second magnetic field externally to the electronic device;
   obtain a second sensing value of the second magnetic field from the second coil assembly; and
   obtain the reference value used to identify whether the foreign material exists, by normalizing the second sensing value using a magnitude of the second current.

8. The electronic device of claim 1, wherein the processor is further configured to:
   obtain sensing values sensed by coils of a specific group from among the plurality of coils;
   compare sensing values obtained from adjacent coils of the specific group with each other; and
   based on a difference between the sensing values obtained from the adjacent coils being greater than a preset value, identify that the foreign material exists.

9. The electronic device of claim 1, wherein the first coil assembly comprises a coil configured to transmit power to the external wireless power receiver, and the second coil assembly comprises the plurality of coils used to identify whether the foreign material exists, and
wherein the second coil assembly is disposed on the first coil assembly.

10. A method of operating an electronic device for wirelessly transmitting power, the electronic device comprising a first coil assembly and a second coil assembly, the method comprising:
generating, by the electronic device, a first magnetic field by applying first current to the first coil assembly of the electronic device, the second coil assembly including a plurality of coils;
obtaining, by the electronic device, a plurality of first sensing values of the first magnetic field sensed by the plurality of coils included in the second coil assembly of the electronic device; and
identifying, by the electronic device, whether a foreign material exists in a power transmission area of the electronic device based on the plurality of first sensing values,
wherein the second coil assembly is positioned between the first coil assembly and an external wireless power receiver,
wherein the method further comprises:
identifying, by the electronic device, whether the external wireless power receiver exists in the power transmission area; and
obtaining, by the electronic device, a reference value based on identifying whether the external wireless power receiver exists in the power transmission area,
wherein the identifying of whether the foreign material exists in the power transmission area comprises identifying whether the foreign material exists in the power transmission area further based on the obtained reference value, and
wherein the obtaining of the reference value comprises obtaining a first value as the reference value based on the external wireless power receiver existing in the power transmission area of the electronic device, and obtaining a second value as the reference value based on the external wireless power receiver not existing in the power transmission area of the electronic device, the first value being different from the second value.

11. The method of claim 10, wherein the identifying of whether the foreign material exists comprises:
normalizing the plurality of first sensing values by using a magnitude of the first current;
comparing each of the plurality of normalized first sensing values with the reference value; and
identifying whether the foreign material exists based on comparing each of the plurality of normalized first sensing values with the reference value.

12. The method of claim 11, wherein the identifying of whether the foreign material exists comprises:
comparing the reference value with sensing values sensed by coils of a specific group from among the plurality of coils; and
based on a difference between the reference value and a sensing value sensed by at least one of the coils of the specific group being greater than a preset value, identifying that the foreign material exists.

13. The method of claim 12, further comprising identifying that the foreign material exists at a position corresponding to the at least one coil.

14. The method of claim 11, wherein the identifying of whether the foreign material exists comprises, based on each sensing value obtained from coils of a first group from among the plurality of coils increasing above the reference value, and each sensing value obtained from coils of a second group from among the plurality of coils decreasing below the reference value, identifying that the foreign material exists.

15. The method of claim 14, further comprising identifying that the foreign material exists at a position corresponding to the coils of the second group.

16. The method of claim 10, further comprising:
in an absence of the foreign material, applying second current to the first coil assembly to output a second magnetic field externally to the electronic device;
obtaining a second sensing value of the second magnetic field from the second coil assembly; and
obtaining the reference value used to identify whether the foreign material exists, by normalizing the second sensing value using a magnitude of the second current.

17. The method of claim 10, wherein the identifying of whether the foreign material exists comprises:
obtaining sensing values sensed by coils of a specific group from among the plurality of coils;
comparing sensing values obtained from adjacent coils of the specific group with each other; and
based on a difference between the sensing values obtained from the adjacent coils being greater than a preset value, identifying that the foreign material exists.

18. An electronic device for wirelessly transmitting power, the electronic device comprising:
a first coil assembly;
a second coil assembly including a plurality of coils, the second coil assembly being positioned between the first coil assembly and an external wireless power receiver;
a memory configured to store instructions; and
a processor configured to execute the instructions to:
control the first coil assembly to generate a first magnetic field by applying first current to the first coil assembly;
obtain a plurality of first sensing values of the first magnetic field sensed by the plurality of coils included in the second coil assembly; and
identify whether a foreign material exists in a power transmission area of the electronic device based on the plurality of first sensing values,
wherein the processor is further configured to:
identify whether the external wireless power receiver exists in the power transmission area;
obtain a reference value based on identifying whether the external wireless power receiver exists in the power transmission area; and
identify whether the foreign material exists in the power transmission area of the electronic device further based on the obtained reference value,
wherein the processor is further configured to obtain a first value as the reference value based on the external wireless power receiver existing in the power transmission area of the electronic device, and obtain a second value as the reference value based on the external wireless power receiver not existing in the power transmission area of the electronic device, the first value being different from the second value.

* * * * *